United States Patent
Nutt et al.

(10) Patent No.: US 7,894,297 B2
(45) Date of Patent: Feb. 22, 2011

(54) METHODS AND APPARATUS FOR BOREHOLE SENSING INCLUDING DOWNHOLE TENSION SENSING

(75) Inventors: Les Nutt, Houston, TX (US); Tsutomu Yamate, Yokohama (JP); Masahiro Kamata, Kawasaki (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 586 days.

(21) Appl. No.: 11/682,326

(22) Filed: Mar. 6, 2007

(65) Prior Publication Data

US 2007/0165487 A1 Jul. 19, 2007

Related U.S. Application Data

(63) Continuation-in-part of application No. 10/104,320, filed on Mar. 22, 2002, now Pat. No. 7,187,620.

(51) Int. Cl.
*G01V 1/00* (2006.01)
(52) U.S. Cl. .................. 367/25; 367/188; 166/301; 175/45
(58) Field of Classification Search ............ 367/25, 367/35, 57, 82, 188; 166/66, 77.51, 301; 175/45
See application file for complete search history.

(56) References Cited

U.S. PATENT DOCUMENTS

| | | | |
|---|---|---|---|
| 3,373,817 A | | 3/1968 | Cubberly, Jr. et al. |
| 4,237,972 A | * | 12/1980 | Lanmon, II ............... 166/54.5 |
| 4,265,110 A | * | 5/1981 | Moulin .................... 73/152.59 |
| 4,269,063 A | * | 5/1981 | Escaron et al. ........... 73/152.59 |
| 4,648,444 A | * | 3/1987 | Busch ....................... 166/65.1 |
| 4,701,891 A | | 10/1987 | Castagna et al. |
| 4,953,136 A | | 8/1990 | Kamata et al. |
| 4,998,294 A | | 3/1991 | Banks et al. |
| 5,044,460 A | | 9/1991 | Kamata et al. |
| 5,109,921 A | * | 5/1992 | Aracena ..................... 166/65.1 |
| 5,119,679 A | | 6/1992 | Frisch |
| 5,201,814 A | * | 4/1993 | Kitchell et al. ............ 166/65.1 |
| 5,271,075 A | | 12/1993 | Gfeller et al. |

(Continued)

FOREIGN PATENT DOCUMENTS

EP 0409361 A2 1/1991

(Continued)

OTHER PUBLICATIONS

M.R. Islam, SPE, Dalhousie University, Faculty of Engineering, "Emerging Technologies in Subsurface Monitoring of Petroleum Reservoirs", SPE 69440.

(Continued)

*Primary Examiner*—Mark Hellner
(74) *Attorney, Agent, or Firm*—Daryl R. Right; Jody DeStefanis; Jeff Griffin

(57) ABSTRACT

The present disclosure provides, among other things, apparatuses and methods for sensing subsurface data. One embodiment comprises borehole conveyance system tool, the borehole conveyance system tool comprising a conveyance, a sensor array disposed on the conveyance, and an acquisition electronics section disposed on the conveyance distal of the sensor array. One embodiment includes at least one downhole tension sensor to help indicate when a tool is stuck and what part of the tool is stuck.

27 Claims, 15 Drawing Sheets

U.S. PATENT DOCUMENTS

| | | | | |
|---|---|---|---|---|
| 5,363,921 | A | * | 11/1994 | Mendez ..................... 166/377 |
| 5,597,042 | A | | 1/1997 | Tubel et al. |
| 5,662,165 | A | | 9/1997 | Tubel et al. |
| 5,664,035 | A | | 9/1997 | Tsuji et al. |
| 5,667,023 | A | | 9/1997 | Harrell et al. |
| 5,730,219 | A | | 3/1998 | Tubel et al. |
| 5,857,710 | A | | 1/1999 | Leising et al. |
| 5,859,719 | A | | 1/1999 | Dentai et al. |
| 5,947,198 | A | | 9/1999 | McKee et al. |
| 5,984,006 | A | * | 11/1999 | Read et al. ................... 166/63 |
| 5,984,009 | A | * | 11/1999 | DiFoggio ............... 166/250.13 |
| 6,006,832 | A | | 12/1999 | Tubel et al. |
| 6,019,173 | A | | 2/2000 | Saurer et al. |
| 6,032,733 | A | * | 3/2000 | Ludwig et al. ................ 166/60 |
| 6,065,538 | A | | 5/2000 | Reimers et al. |
| 6,131,658 | A | | 10/2000 | Minear |
| 6,160,762 | A | | 12/2000 | Luscombe et al. |
| 6,161,433 | A | | 12/2000 | Erath |
| 6,192,983 | B1 | | 2/2001 | Neuroth et al. |
| 6,253,848 | B1 | | 7/2001 | Reimers et al. |
| 6,268,911 | B1 | | 7/2001 | Tubel et al. |
| 6,269,198 | B1 | | 7/2001 | Hodgson et al. |
| 6,269,883 | B1 | | 8/2001 | Gissler et al. |
| 6,357,539 | B1 | | 3/2002 | Ruttley |
| 6,374,913 | B1 | | 4/2002 | Robbins et al. |
| 6,408,943 | B1 | | 6/2002 | Schultz et al. |
| 6,431,269 | B1 | * | 8/2002 | Post et al. .................. 166/65.1 |
| 6,450,022 | B1 | * | 9/2002 | Brewer .................... 73/152.48 |
| 6,526,818 | B1 | | 3/2003 | Head et al. |
| 6,577,244 | B1 | | 6/2003 | Clark et al. |
| 6,614,718 | B2 | | 9/2003 | Cecconi et al. |
| 6,618,675 | B2 | * | 9/2003 | Strickland ...................... 702/6 |
| 6,662,645 | B2 | * | 12/2003 | Brewer .................... 73/152.48 |
| 6,670,813 | B2 | * | 12/2003 | Strack ........................ 324/323 |
| 6,737,623 | B2 | | 5/2004 | Suzunaga et al. |
| 6,978,832 | B2 | | 12/2005 | Gardner et al. |
| 7,124,818 | B2 | | 10/2006 | Berg |
| 7,359,647 | B1 | | 4/2008 | Faria et al. |
| 2002/0000320 | A1 | | 1/2002 | Gissler |
| 2002/0185273 | A1 | | 12/2002 | Aronstam et al. |
| 2002/0196993 | A1 | | 12/2002 | Schroeder |
| 2003/0081501 | A1 | | 5/2003 | Nightingale et al. |
| 2003/0102132 | A1 | | 6/2003 | Estep et al. |
| 2003/0117895 | A1 | | 6/2003 | Brandsaeter |
| 2003/0179651 | A1 | | 9/2003 | Nutt et al. |
| 2006/0202109 | A1 | | 9/2006 | Delcher et al. |

FOREIGN PATENT DOCUMENTS

| | | |
|---|---|---|
| WO | 9850680 A2 | 11/1998 |
| WO | 0177488 A1 | 10/2001 |
| WO | 2004/020774 | 3/2004 |

OTHER PUBLICATIONS

J. Algeroy, SPE, and R. Pollock, SPE, Schlumberger, "Equipment and Operation of Advanced Completions in the M-15 Wytch Farm Multilateral Wall", SPE 62951.

READ News, Dec. 2001, Read Group, Inc. marketing brouchure.

Imaging the Invisible—Q-Borehole—, pp. 18-31, Marketing CD, 2000.

S. T. Vohra, B. Danver, A.B. Tveten and A. Dandridge, "High Performance Fiber Optic Accelerometers", Proceedings of OFS-11, U.S. Naval Research Laboratory, pp. 654-657, 1996.

K. Dobashi, H. Arai, R. Sato and Y. Kohama, "A study on the allowable number of fiber-optic sensors with time-division multiplexing", pp. 522-525, UDT, 1995.

Litton catalog, "Fiber Optic Borehole System Hydrophone Array".

Good vibrations, Well Evaluation, pp. 19-33, 1988.

\* cited by examiner

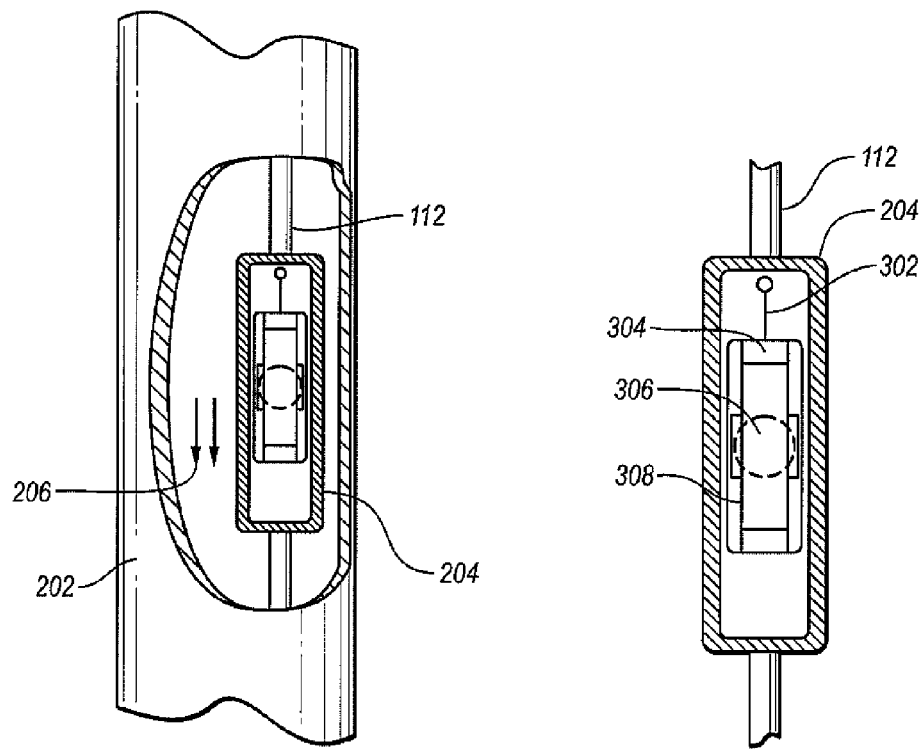
FIG. 2
FIG. 3A
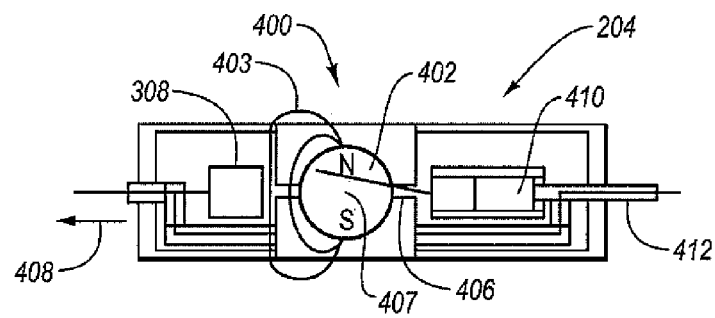
FIG. 4A
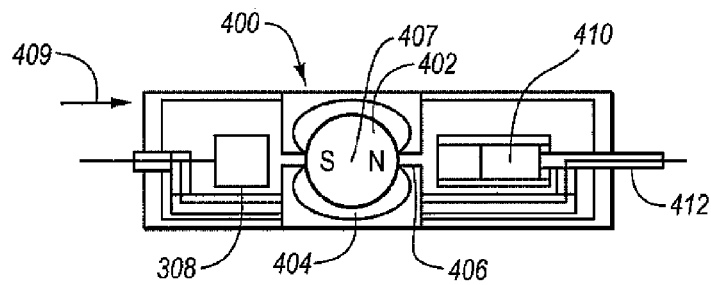
FIG. 4B

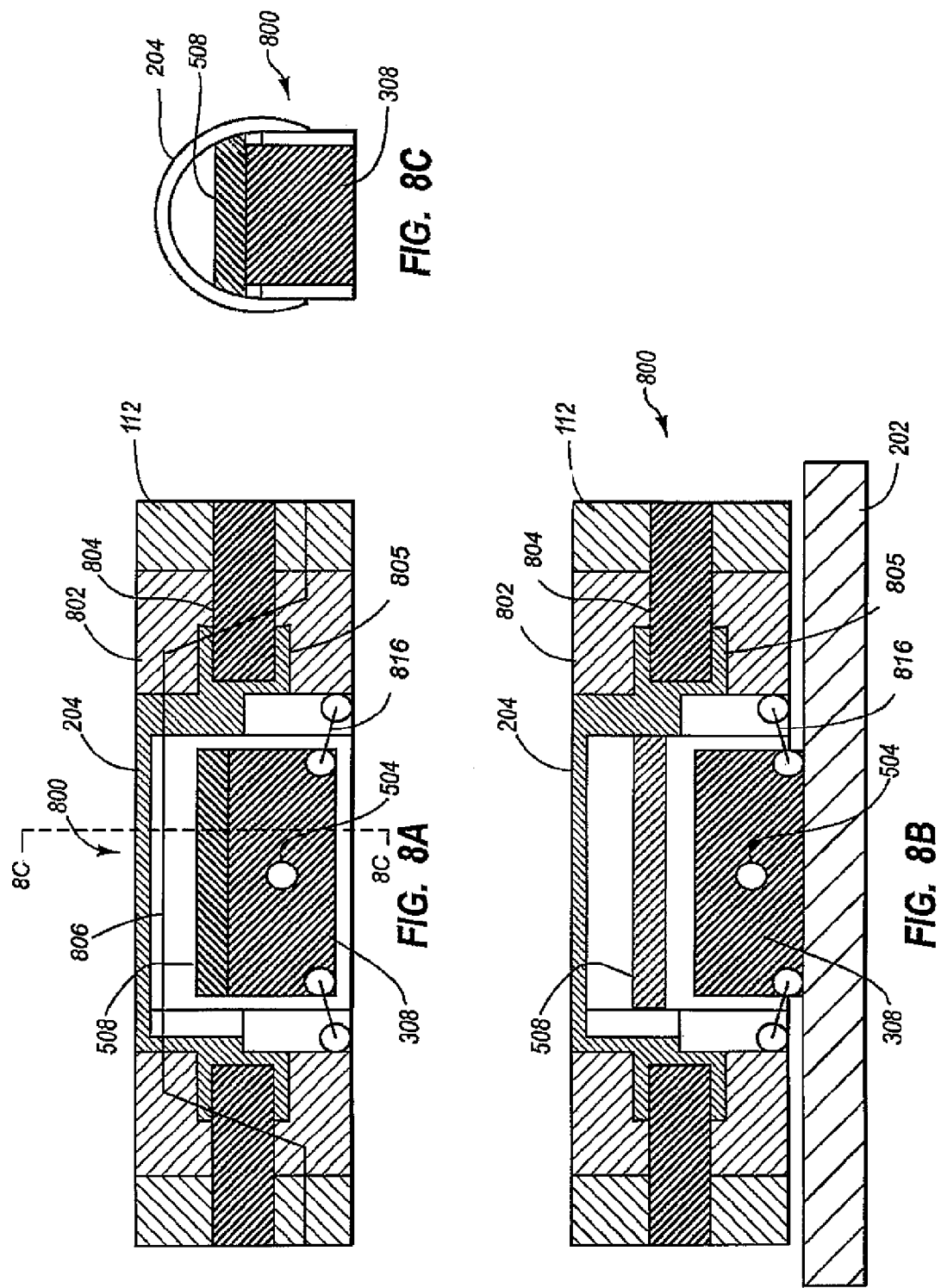

METHODS AND APPARATUS FOR BOREHOLE SENSING INCLUDING DOWNHOLE TENSION SENSING

RELATED APPLICATIONS

This is a continuation-in-part of U.S. patent application Ser. No. 10/104,320 filed 22 Mar. 2002 and entitled "Method and Apparatus for Borehole Sensing," which is hereby incorporated in its entirety by this reference.

FIELD

This relates to oil and gas exploration and production, and more particularly to conveyed borehole sensor systems.

BACKGROUND

Borehole seismic data can be utilized to refine surface seismic data prior to drilling production wellbores. Borehole seismic data can further be gathered on a continuing or recurrent basis to monitor subsurface formations and reservoirs during production of the well. The gathering of seismic data on a continuing basis facilitates extraction of gas or oil deposits.

Borehole seismic surveys are usually conducted by placing seismic receivers in a borehole and firing a seismic source at the surface to generate an acoustic wave. The receivers are often placed in a shuttle and deployed downhole for the duration of the survey. The receivers are generally retrieved following the survey. The amount of information that can be obtained in borehole seismic surveys is sometimes limited by the logistics of deploying the shuttles downhole.

As borehole surveys have advanced, the number of receivers and the distance between receivers and sources has generally increased to improve the ability to detect formation characteristics in the undisturbed formation at increasing distances from the borehole. Increasing the distance between the source and the receivers results in deeper seismic wave penetration. Therefore the receivers detect signals that are representative of conditions at greater distances from the borehole. Nevertheless, increasing the distance between sources and receivers also requires an increased tool length, and longer tools can cause difficulties with deployment. Increased distances between sources and receivers also result in longer logging periods, more down-time for the drilling rigs, and higher costs.

A downhole seismic logging tool for generating a seismic survey may include a proximal logging head, telemetry electronics, data acquisition electronics, and an array of shuttles interconnected by flexible cables. The logging head, and the sections for telemetry electronics and acquisition electronics are generally quite heavy and connected in series. The shuttles in the array, on the other hand, are usually small and relatively light for better acoustic performance. The entire logging tool is usually deployed by an armored logging cable connected by the logging head. The tension on the logging cable is typically monitored by a surface cable winch.

There are substantial risks involved when advancing and retracting the array of shuttles into and out of a wellbore. For example, if a shuttle is obstructed when a logging tool is advanced downhole, the interconnect cable tends to collect on the obstructed shuttle. If an operator notices an obstructed shuttle (by monitoring tension at the uphole winch), he can stop the winch and attempt to avoid cable tangling, but many times an obstructed shuttle is generally difficult to notice until the cable becomes hopelessly entangled, especially when the number of shuttles is large, and the weight of a shuttle is small compared to the entire weight of the array, small change in conveyance tension is difficult to detect.

To avoid shuttle encumbrances, shuttles are sometimes locked radially inward by mechanical arms, springs, or magnetic clamps. However, shuttles are often released and stationed at a single location for a period of time while measurements are taken. When the shuttles are stationary, the cables can become trapped, by, for example, a cable being pulled into the mud cake as a result of differential pressures between the borehole and an adjacent formation. The differential sticking can occur for hundreds of meters of cable such that the logging tool below the stuck cable can not be retrieved.

As mentioned above, cable tension is often monitored at surface as a tool is deployed downhole. However, a surface tension measurement is far from fail-safe. Logging tool cables are generally long and heavy, and therefore the surface tension is ever-increasing. Small changes in tension can easily go undetected until well after excess cable accumulates over an obstructed tool. After a deployment of any significant distance, the cable is much heavier than a downhole tool, and the surface tension changes are dominated by the weight of the lengthening cable. Only a very small fraction of the surface tension measured will be a result of an obstructed tool. Accordingly, a stuck tool may result in a tangled cable, which makes tool recovery difficult.

If a downhole logging tool gets stuck, one way to recover the tool is by conventional "fishing." However, it is important to know what section of the tool is stuck in order to plan a recovery operation. Generally, there are two ways to fish out a downhole tool. One way is to put the cable in tension and increase the tension above the capacity of a pre-designated weak point at the logging head known as an overpull operation. The weak point breaks above a certain tension, and once broken the cable can generally be removed from the wellbore. Following removal of the cable, an "overshot" may be send downhole. An "overshot" may be a series of connected drill-pipes with a distal grabber. When the overshot reaches to the logging head, it grabs the tool. Drill-pipe is generally much stronger than cable, and the drill-pipe is retracted, usually bringing the tool with it. In the case of a tool having an array of sensor shuttles, connected by flexible cable, below the logging head and telemetry section, if the head and telemetry sections are not anchored, the overpull operation causes the head and telemetry sections to drop onto the sensor array such that a fishing operation is not possible over the tangled cable.

Another way to begin a downhole tool recovery operation is to cut the logging cable at the surface. Generally the cable is clamped at the wellhead prior to cutting. A drillstring is then run over the cable, and the drillstring eventually grabs and retrieves the stuck tool. This process is often referred to as "cut and thread," and is very time consuming.

SUMMARY

The present disclosure addresses at least some of the above-described needs and others. Specifically, one embodiment provides an apparatus comprising a borehole conveyance system tool. The borehole conveyance system tool comprises a conveyance, a sensor array disposed on the conveyance, and an acquisition electronics section disposed on the conveyance distal of the sensor array. In one embodiment, the acquisition electronics section comprises a logging head, telemetry electronics, and acquisition electronics. In one embodiment, the logging head comprises a weak point and a tension meter, the tension meter capable of reporting a measured tension.

In some embodiments, the sensor array comprises a plurality of spaced acoustic receivers. In one embodiment, the sensor array comprises a distal end of the conveyance. In one embodiment, the conveyance is a wire line cable and each acoustic receiver is packaged in a shuttle, the shuttle being approximately flush with an outer diameter of the wire line cable. In one embodiment the conveyance is a wire line cable and each acoustic receiver is embedded in the wire line cable.

One embodiment of the apparatus further comprises a downhole tension meter (which is capable of reporting a measured tension value or number) between the sensor array and the acquisition electronics section. One embodiment further comprises a weak point disposed between the sensor array and the acquisition electronics section.

In one embodiment, the sensor array comprises a plurality of acoustic receivers, and the apparatus further comprises a tension meter (capable of reporting a measured tension) disposed between at least one adjacent pair of acoustic receivers. In one embodiment, the sensor array comprises a plurality of acoustic receivers, and the apparatus further comprises a tension meter disposed between each adjacent pair of acoustic receivers. One embodiment further comprises a weak point disposed between each adjacent pair of acoustic receivers.

In one embodiment, the sensor array comprises a plurality of acoustic receivers, each acoustic receiver attached to another adjacent acoustic receiver by an interconnect cable. The interconnect cable comprises a weak point and a tension meter. In one embodiment the conveyance comprises a wireline logging cable.

One embodiment of the apparatus further comprises a hollow fishing tool. The hollow fishing tool comprises an internal passage capable of sliding over the conveyance and over the sensor array. The hollow fishing tool comprises a grabbing mechanism for grabbing the acquisition electronics section. In one embodiment, the hollow fishing tool is attached to a distal end of a drillpipe. In one embodiment, the grabbing mechanism comprises barbed teeth configured to grab a logging head of the acquisition electronics section.

One aspect provides a method comprising conveying a seismic sensing tool into a borehole (the seismic sensing tool comprising a sensor array and an acquisition electronics section disposed distal of the sensor array), and weighing down the sensor array with the acquisition electronics section. In one embodiment the method further comprises sensing tension between the sensor array and the acquisition electronics section with a downhole tension meter located local to the sensor array and acquisition electronics section, and reporting a tension measurement value uphole from the tension meter. In one embodiment, the method further comprises sensing tension between sensors of the sensor array with one or more downhole tension meters located between adjacent sensors, and reporting a tension measurement value uphole from the one or more tension meters.

Some embodiments of the method further comprise feeding a fishing tool over a conveyance of the seismic sensing tool, sliding the fishing tool over the sensor array, grabbing a head of the acquisition electronics section with the fishing tool, and retrieving the acquisition electronics section. One method further comprises breaking a weak point between the sensor array section (proximal) and the distal acquisition electronics section, conveying a fishing tool to the acquisition electronics section, grabbing a head of the acquisition electronics section with the fishing tool, and retrieving the acquisition electronics section.

One embodiment comprises an acoustic logging tool. The acoustic logging tool comprises a conveyance, an acquisition electronics section disposed on the conveyance, a sensor array disposed on the conveyance, and at least one tension meter (capable of measuring and reporting a tension value) local to the acquisition electronics section and the sensor array. In one embodiment, at least one tension meter is located between the acquisition electronics section and the sensor array. In one embodiment, at least one tension meter is arranged between one or more sensors of the sensor array. In one embodiment, at least one tension meter is located at a logging head of the acquisition electronics section. In one embodiment, the acquisition electronics section is arranged distal to the sensor array.

One embodiment comprises an acoustic logging tool fisher. The acoustic logging tool fisher comprises a hollow mandrel having a first end attachable to a drill pipe and a second end, the hollow mandrel comprising a passage therethrough; an open-mouth taper at the second end, and an acoustic logging tool grabbing mechanism. In one embodiment, the grabbing mechanism comprises a plurality of barbed teeth extending radially inward from the passage for grabbing a head of an acoustic logging tool.

One aspect provides a method of fishing out a stuck logging tool. The method comprises feeding a hollow fishing tool over a wire line cable, grabbing the logging tool, and retrieving the logging tool. In one embodiment, the method comprises feeding the hollow fishing tool over an acoustic sensor array before grabbing the logging tool.

One embodiment comprises a wireline conveyance having a sensor section. Various sensors of the sensor section may attach to the conveyance, and a weak point in the conveyance is located below the sensor section. Large main electronics cartridges, weights, and/or other components may be attached to the conveyance below the weak point. Such an arrangement may facilitate fishing a stuck tool and, if necessary, breaking away the upper portion of the conveyance at the weak point.

One embodiment comprises an apparatus and a method of removably deploying sensor arrays. The method may include extending a coiled tube (or other suitable conveyance including, but not limited a cable line, wire line or slickline) downhole into a survey borehole. The coiled tube or other suitable conveyance may include a plurality of shuttles attached thereto, and the shuttles include seismic sensor packages. Some systems may include a magnetic clamp capable of multiple positions. For example, in a non-magnetic clamping state, the plurality of seismic sensor packages may be arranged adjacent to or general flush with a survey tool. However, if the magnetic clamp is activated, the seismic sensor package(s) may be clamped to the borehole casing or borehole wall. One method may include magnetically unclamping a plurality of seismic sensor packages and retracting the deployment mechanism to remove the seismic sensors packages from the borehole. One method may include magnetically unclamping the plurality of seismic sensor packages, repositioning the seismic sensor packages in the borehole, and reclamping the seismic sensor packages. Deploying, clamping, repositioning, and reclamping may be controllably executed at the surface.

Some magnetic clamps disclosed herein are more compact as compared to typical mechanical surface force clamping devices found in the prior art. Some of the magnetic clamps disclosed herein do not involve engagement of or movement of mechanical parts exposed outside shuttle. Also, some magnet clamps do not have to be positioned in a side passageway away from a primary flow passageway of a well, eliminating the need for mechanical anchoring arms (and enabling smaller shuttles). One embodiment of a magnet clamp comprises a hydraulic actuator control system adapted to hydraulically control a downhole actuator. In aspects disclosed herein, the hydraulic actuator control system may be located at the surface, or inside the shuttle body, or with the electronics section. The downhole actuator may position a magnet in order to engage or disengage a seismic sensor package with a borehole wall. Electrical actuator control systems may also be used to move the magnet and engage or disengage a seismic sensor package. A downhole magnetic clamp offers more reliable package movement as compared to typical mechanical surface force clamps, and may enable a seismic sensor system to be used multiple times in different boreholes.

Another embodiment comprises a conveyance having a sensor section. Various sensors of the sensor section are attached to the conveyance. Thus, the sensor section may have a relatively small diameter substantially equal to the outer diameter of the conveyance itself. A weak point in the conveyance may be formed below the sensor section. Main electronics cartridges, weights, and/or other relatively large components may comprise a diameter larger than the sensor section, and may be attached to the conveyance below the weak point. Arranging a sensor section of relatively small diameter proximal of main electronics and weight section may facilitate fishing an obstructed tool, and, if necessary, breaking away the upper portion of the conveyance at the weak point.

One embodiment incorporates one or more double-action or bow springs with the sensor packages to facilitate coupling and decoupling of the sensor to a borehole wall. A double-action spring can be adapted to both extend the shuttle away from the conveyance and toward the borehole wall or casing, and retract the shuttle back against the conveyance.

One embodiment utilizes hydraulic power to control positioning of a magnet clamp. Hydraulic pressure from the surface may position an actuator, and the actuator controls the position of the magnet to effect clamping and unclamping. A wire line cable and a plurality of shuttles may be spooled downhole either in a clamped or an unclamped state. A magnet clamp can be initially activated prior to deployment for permanent monitoring applications that do not require future deactivation. In some cases, magnetic clamps may be pre-activated and deployed directly into a well bore as the well bore is established.

Some embodiments provide methods and apparatus utilizing fiber optic communication and sensor systems with a plurality of shuttle devices and associated sensor packages. The shuttle devices may be directly attached to a coiled tubing, cable line, wire line, slickline, or other suitable downhole conveyance, such as production tubing. Shuttles provide housings for sensors or sensor packages, and each shuttle may contain a magnetic coupling clamp enabling radial expansion and retraction of the sensors or sensor packages. Thus, the sensors may be removably deployed downhole into a survey borehole for recording multi-level three-dimensional borehole seismic data or other operations. One borehole monitoring or deployment tool comprises a coiled tubing, a cable line, wire line, slickline or other suitable conveyance containing a plurality of shuttle devices having fiber optic seismic sensors.

In one embodiment, fiber optic systems operate passively and downhole electronics and associated power are not required. Downhole fiber optic components may improve reliability of a downhole seismic sensor system, particularly in high temperature environments. Any electronics necessary for operating the fiber optic sensor arrays can be located at the surface, where they can potentially be shared with other wells and utilized for multiple downhole fiber optic sensor systems. Also, fiber optic components may facilitate smaller profile tools and lighter weight systems.

One embodiment provides a method of calibrating a borehole sensing system. The method includes providing a fiber optic sensor section on a conveyance system comprising an optical communication fiber. Sensors of the fiber optic sensor section are communicably linked and acoustically coupled to a transducer. The method includes communicably linking the optical communication fiber to an optical electronics converter and communicably linking the optical electronics converter to the transducer. The method also includes introducing an optical signal into the communication fiber, activating the transducers by detecting the optical signal with the fiber optic sensors, exciting the fiber optic sensors by activating one or more transducers, measuring a response of the sensors, determining an expected response of the sensors based on input optical signal, and comparing measured response with expected response of the fiber optic sensors.

BRIEF DESCRIPTION OF THE DRAWINGS

The accompanying drawings illustrate certain embodiments and are a part of the specification.

FIG. 1 illustrates a representative cross section of subsurface formations with a borehole extending therethrough;

FIG. 2 is an enlarged diagrammatic cutaway view of a cable line tool according to one embodiment;

FIG. 3A is a diagrammatical cross section of a shuttle shown in FIG. 2 revealing borehole sensors and a magnet clamp;

FIG. 4A is a cross section of the magnet clamp showing a hydraulic actuator and a magnet element in a clamp position according to one embodiment;

FIG. 4B is a cross section of the magnet clamp showing the hydraulic actuator and the magnet element of FIG. 4A in a unclamped position;

FIG. 8A is a diagrammatical section of a wire line downhole survey tool with a clamp in a first position according to one embodiment.

FIG. 8B is a diagrammatical section of the wireline downhole survey tool and clamp of FIG. 8A in a second position;

FIG. 8C is a end-cross-sectional view of the wireline downhole survey tool and clamp of FIG. 8B in the second position.

Figure 1:
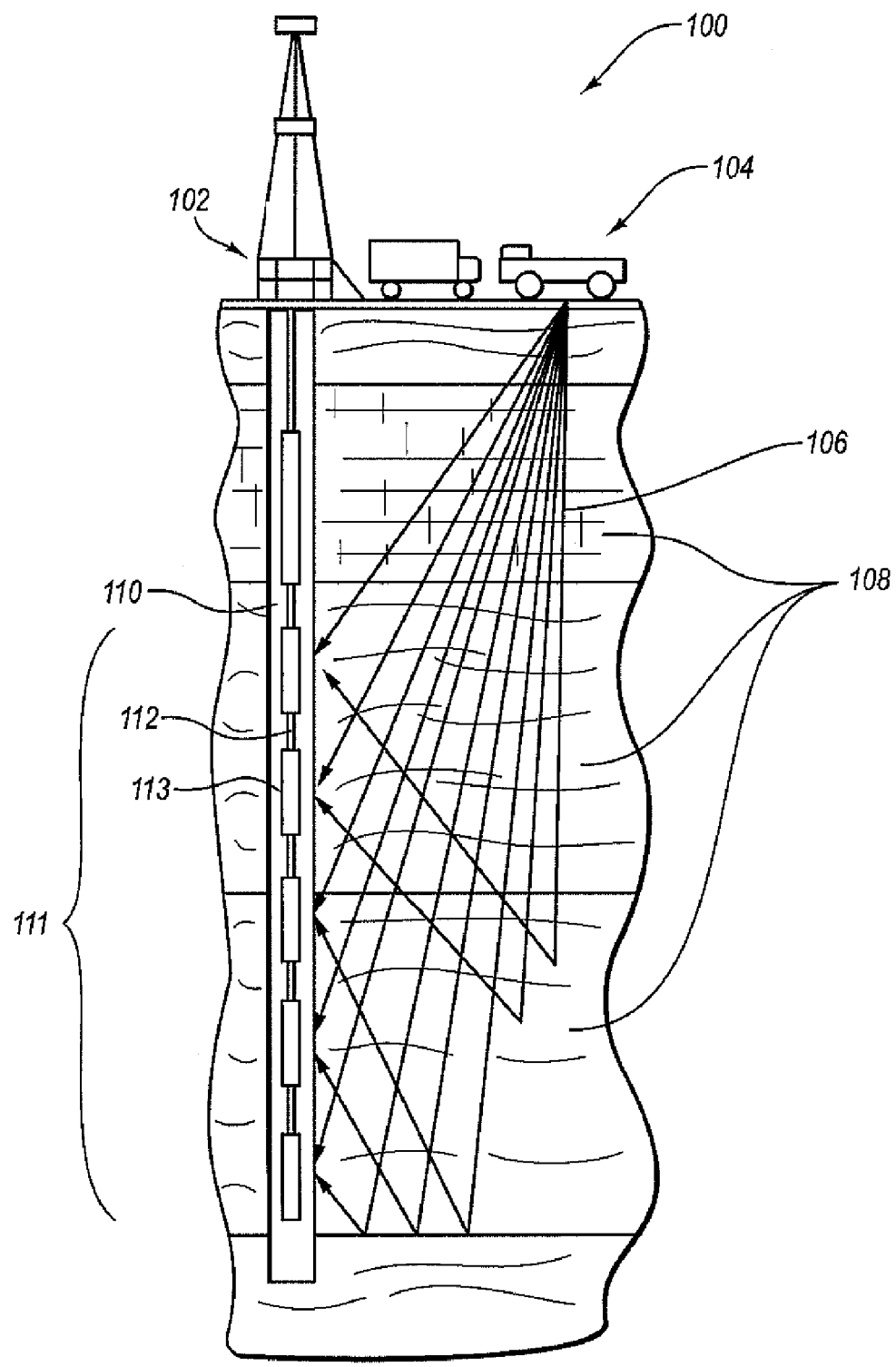
FIG. 1 is a diagrammatic view depicting a typical well site.

Throughout the drawings, identical reference numbers indicate similar, but not necessarily identical elements. While the principles described herein are susceptible to various modifications and alternative forms, specific embodiments have been shown by way of example in the drawings and will be described in detail herein. However, it should be understood that the invention is not intended to be limited to the particular forms disclosed. Rather, the invention includes all modifications, equivalents and alternatives falling within the scope of the appended claims.

DETAILED DESCRIPTION

Illustrative embodiments and aspects are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment of this invention.

The present disclosure provides, among other things, apparatus and methods for removably deploying and/or fishing seismic sensor arrays in a borehole or wellbore for efficiently recording subsurface seismic data, magnetically clamping sensor packages to wellbore casings or walls, and measuring survey tool tension downhole. One embodiment is designed with a plurality of shuttle containers ("shuttles"), each shuttle containing a sensor array. In one embodiment, the shuttles are attached along the wire line, coiled tubing or other deployment mechanism. One apparatus is adapted to lower or spool the wire line down the borehole then actuate a magnetic clamp (which may be integral with the shuttle) to magnetically clamp and acoustically couple the sensors to a borehole casing. As described in more detail below, one or more magnetic clamps may be deactuated to unclamp the sensors from the borehole casing. The wire line or cable line may be advanced and retracted with a spooling mechanism known by those of ordinary skill in the art having the benefit of this disclosure. Some embodiments include predetermined weak points to aid in the retrieval of stuck tools, and some embodiment downhole survey tool tension meters.

Turning now to the drawings, and in particular to FIG. 1, a diagrammatic view of a well site 100 is shown in partial cross section. The well site 100 and associated apparatus described below may be used to conduct a seismic survey or a well bore log. The well site 100 includes well equipment and instrumentation 102 at the surface and may include any instrumentation and monitoring systems known to those of ordinary skill in the art having the benefit of this disclosure. The well site 100 includes a surface seismic source, which is depicted in FIG. 1 as a vibration vehicle 104, in proximity to a well bore 110. A downhole tool, such as a logging tool 111, extends into the well bore 110. A plurality of lines 106 represents seismic waves or vibrations traveling through subsurface formations 108. The seismic waves generate seismic data that can be sensed by sensors or sensor arrays 113 of the logging tool 111. Some of the equipment shown at the well site 100 may be used to control and monitor production operations.

As shown in FIG. 1, the logging tool 111 may be conveyed by a wire line or cable line 112, but the logging tool 111 may also comprise a coiled tubing or any other conveyance, for example, production tubing, according to the principles described herein. The logging tool 111 may be deployed or spooled to extend into the well bore 110 as shown. The logging tool may include the sensor arrays 113 spaced along the wire line 112. In some embodiments, the logging tool 111 may comprise a logging-while-drilling (LWD) tool. In some embodiments, the sensor arrays 113 are permanently deployed for continuous production well monitoring. In the embodiment of FIG. 1, the sensor arrays 113 are part of the logging tool 111 and are temporarily deployed to perform a subsurface seismic survey. Following a seismic survey or well bore 110 logging operation, the logging tool 111 may be retracted. Thus the logging tool 111 may be used for seismic surveys in multiple wells. When the logging tool 111 is positioned at a desired location in the well bore 110, the vibration vehicle 104 or other seismic source may be activated and the seismic data is recorded. It will be understood that the diagram of FIG. 1 is general in nature and used only to illustrate the placement of seismic sensors in a well bore and in proximity to a seismic source to facilitate a seismic survey. Details of certain embodiments of the logging tool 111 or other sensor systems are described below.

FIG. 2 is a cutaway view, shown partially in cross-section, of a borehole casing 202 that may extend into the well bore 110 (FIG. 1) according to one embodiment. As shown in FIG.

2, the wire line 112 extends into the casing 202 and supports a shuttle 204 (which may comprise one of the sensor arrays 113 (FIG. 1)). The wire line 112 and the attached shuttle 204 may be deployed or spooled into the casing 202 as indicated by arrows 206. In the embodiment of FIG. 2, the shuttle 204 houses a borehole sensor or sensor array, and may include a magnetic clamping device (discussed below) to acoustically couple the sensor array to the borehole casing 202. Accordingly, the wire line 112 may comprise at least one communication line and can include at least one clamp actuation line. The communication line of the wire line 112 (or any other conveyance) may comprise one or more fiber optic lines interfacing with one or more fiber optic acoustic sensor devices for uphole transmission of seismic data. The communication line may also comprise one or more electric lines interfacing with electrical sensors. The clamp actuation line, if included, may comprise any appropriate actuator line (hydraulic, electronic, optic, etc.) adapted to actuate a clamp such as a magnetic clamp (discussed below).

FIG. 3A is a magnified view of the shuttle 204 shown in FIG. 2. As mentioned above, the shuttle 204 is attached to the wire line 112. The shuttle 204 may house a fine wire suspension line 302 which is part of an acoustic isolator 304 between an internal sensor package 308 and the shuttle 204. The shuttle 204 and the sensor package 308 are designed to be mechanically reliable and acoustically isolated. That is, the sensor package 308 is isolated from the dynamics of the shuttle 204 and the wire line 112 to facilitate independent seismic recording at each sensor package 308.

Figure 3B:
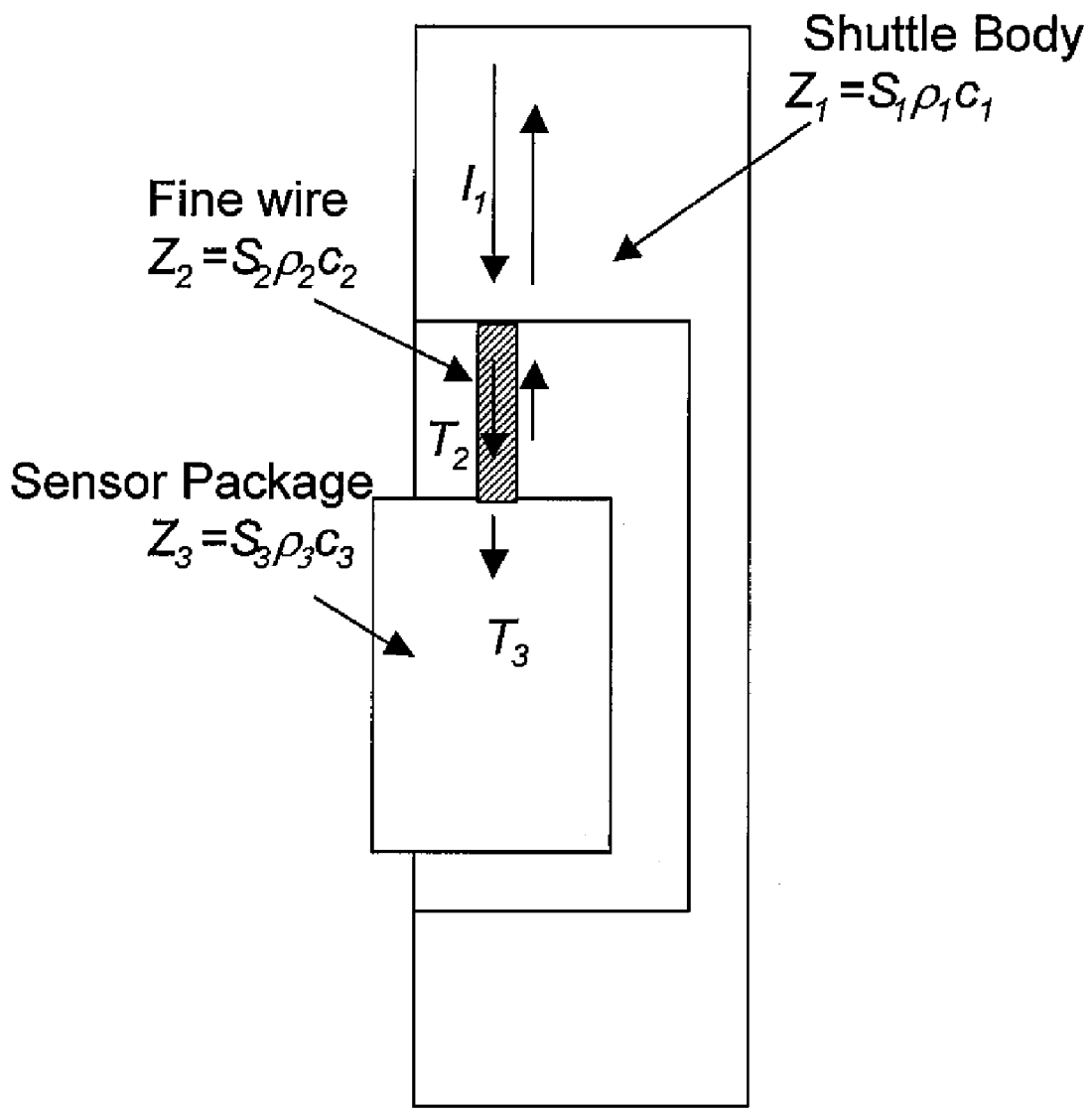
FIG. 3B is a schematic representation of principles of acoustic isolation in accordance with the disclosure herein.

Referring to FIG. 3B, in order to describe the acoustic isolation between the shuttle 204 and the sensor package 308, we will consider the shuttle 204 (and the wireline 112 or other conveyance) as "media 1," the fine wire suspension line 302 as "media 2," and the sensor package 308 as "media 3." Acoustic impedance "Z" is a function of cross sectional area, material density, and sound velocity through the media. For example, acoustic impedance of media 1 is expressed as:

$$Z_1 = S_1 \rho_1 c_1$$

Where Z is acoustic impedance;
S is cross sectional area of the media;
$\rho$ is density of the media; and
c is the speed of sound through the media.

Wave reflection (R) and transmission (T) from media 1 to media 2 is written as:

$$R_1 = \frac{Z_1 - Z_2}{Z_1 + Z_2} I_1 \qquad \text{Eq. (1)}$$

$$T_1 = \frac{2Z_1}{Z_1 + Z_2} I_1$$

where $I_1$ is the intensity of acoustic wave in media (1).

For small $Z_2$, amplitude is doubled, but power is reduced because of the small acoustic impedance. Further, the wave transmission from media 1 to media 3 through media 2 is:

$$T_3 = \frac{2Z_1}{Z_1 + Z_2} \frac{2Z_2}{Z_2 + Z_3} I_1 \qquad \text{Eq. (2)}$$

$$T_3 = \frac{4}{\left(1 + \frac{Z_2}{Z_1}\right)\left(1 + \frac{Z_3}{Z_2}\right)} I_1$$

-continued

For $Z_2 \ll Z_1$ and $Z_2 \ll Z_3$:

$$T_3 = \frac{4Z_2}{Z_3} I_1 \qquad \text{Eq. (3)}$$

Because $Z_2$ is small, the transmitted wave amplitude is also small. And for constant $\rho$ and c:

$$T_3 = \frac{4S_2}{S_3} I_1 \qquad \text{Eq. (4)}$$

Accordingly, the transmitted wave amplitude is reduced by the ratio of the cross sectional area of the media.

The acoustic isolator 304, which may comprise the fine wire suspension line 302 or other medium with a much smaller cross-sectional area than adjacent media, tends to reduce acoustic transmission between adjacent media and is effective to acoustically isolate each sensor package 308 from the acoustic noise and/or motion transmitted through the wire line 112 or shuttle 204. The acoustic isolator 304 allows seismic signals from adjacent formations to be acquired without interference from the dynamics of the shuttle carrier 204 and the wire line 112.

By acoustically isolating the relatively low-mass sensor package 304 from the relatively high-mass shuttle 204 with an intermediate medium such as the fine wire suspension line 302, the ratio of a clamping force (discussed below) to a moving mass (i.e. sensor package 304) increases. A higher ratio of clamping force to moving mass may provide better coupling conditions between the sensor package 304 and the casing 202 when coupling is desired. In addition, although the apparatus described above with reference to FIGS. 2-3 may be used for acoustic isolation, the sensor package 304 may be acoustically coupled to or acoustically isolated from the shuttle 204 by other apparatus, including arrangements wherein the sensor package is permanently affixed to an interior of the shuttle 204 prior to downhole deployment.

One embodiment of the survey tool 111 (FIG. 1) utilizes fiber optic geophones as the sensors of the sensor package 308. Fiber optic geophones are generally available for commercial purposes and convert seismic energy into electro-optical signals that can be transmitted across fiber optic communication lines. Accordingly, in embodiments that include fiber optic geophones, the wire line 112 includes one or more fiber optic communication lines for transmitting seismic data uphole. Nevertheless, the sensors of the sensor package 308 may also comprise hydrophones, geophones, three-axis seismic sensors, or geophone accelerometers, or other devices.

As mentioned above, the shuttle 204 may include or house a clamp to facilitate acoustic coupling between the sensor packages 308 and the casing 202 (or borehole wall). Acoustic clamps may comprise many different embodiments, some of which are described below. Referring to FIGS. 4A and 4B, a schematic representation of one magnetic clamp 400 is shown in a first or actuated position (FIG. 4A) and a second or deactuated position (FIG. 4B). The magnetic clamp 400 moves seismic sensors or the sensor package 308. An actuator device 410 may be used to position a magnet such as a permanent magnet 402 of the magnetic clamp 400. In one embodiment, the permanent magnet 402 comprises a generally cylindrical shape and is polarized radially. In the embodiment of FIGS. 4A and 4B, the permanent magnet 402 is reciprocally mounted within the shuttle 204 on pole pieces 406. The reciprocal mounting allows the permanent magnet 402 to rotate about a cylindrical axis 407. A first position of the permanent magnet 402 shown in FIG. 4A represents a "clamp on" or acoustic clamping position. When the permanent magnet 402 is positioned as shown in FIG. 4A, the sensor package 308 is forced or clamped in the direction of a first arrow 408.

A second position of the permanent magnet 402 is shown in FIG. 4B and represents a "clamp off" or release position. Generally, the sensor package 308 is not acoustically coupled to an adjacent casing or formation when the permanent magnet 402 is in the second position. In the second position, a force is applied to the sensor package 308 in a second direction represented by the second arrow 409.

The clamp 400 is activated when the actuator device 410 rotates the permanent magnet 402 approximately ninety degrees from the second position shown in FIG. 4B to the first position shown in FIG. 4A. Magnetic flux (represented by lines 403 and 404 in FIGS. 4A and 4B, respectively) changes as the permanent magnet rotates. When the permanent magnet is in the first position shown in FIG. 4A, the clamping force tends to force the sensor package 308 radially outward in the direction of the first arrow 408 toward the casing 202 (FIG. 2). The clamping force is perpendicular to the casing 202. The clamp 400 may be operatively connected to and/or integral with the sensor package 308, and is generally lightweight. Accordingly, the effective clamping mass is relatively small as compared to the shuttle 204.

In the embodiment of FIGS. 4A and 4B, the actuating device 410 is a hydraulic actuator. A hydraulic line 412 allows for remote actuation of the actuating device 410. The actuating device 410 may also be activated by any other appropriate actuator means including, but not limited to, an electrical actuator or an electromechanical actuator (in which case an appropriate corresponding signal line may replace the hydraulic line 412).

Figure 5C:
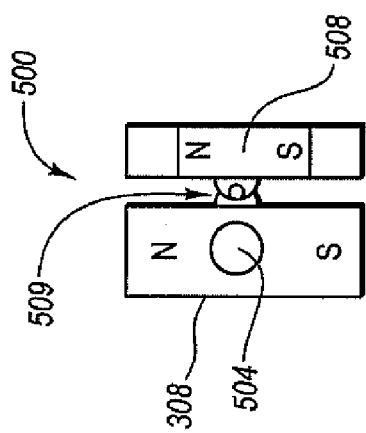
FIG. 5C is an enlarged view of a locking mechanism that may be used with the clamp of FIGS. 5A and 5B according to one embodiment.
Figure 5B:
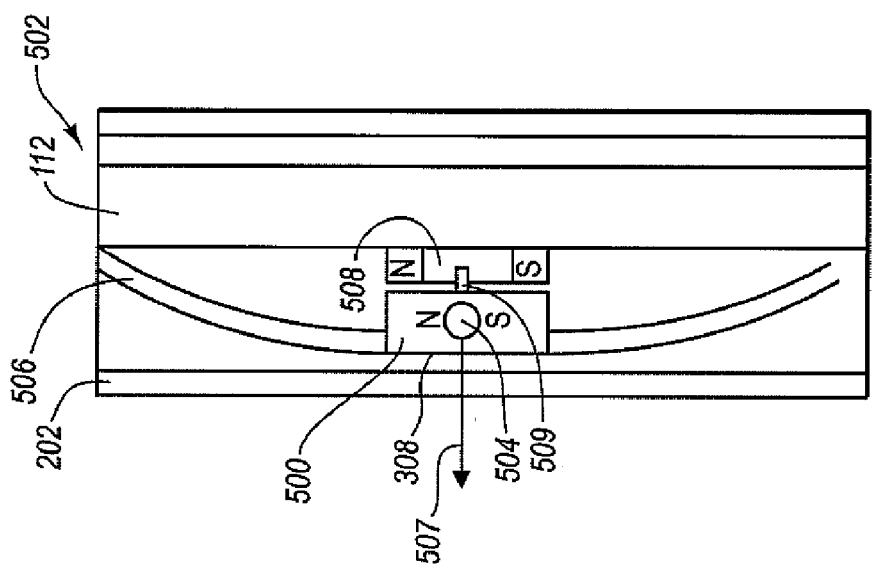
FIG. 5B is a diagrammatical section of the downhole survey tool and clamp of FIG. 5A in a second position.
Figure 5A:
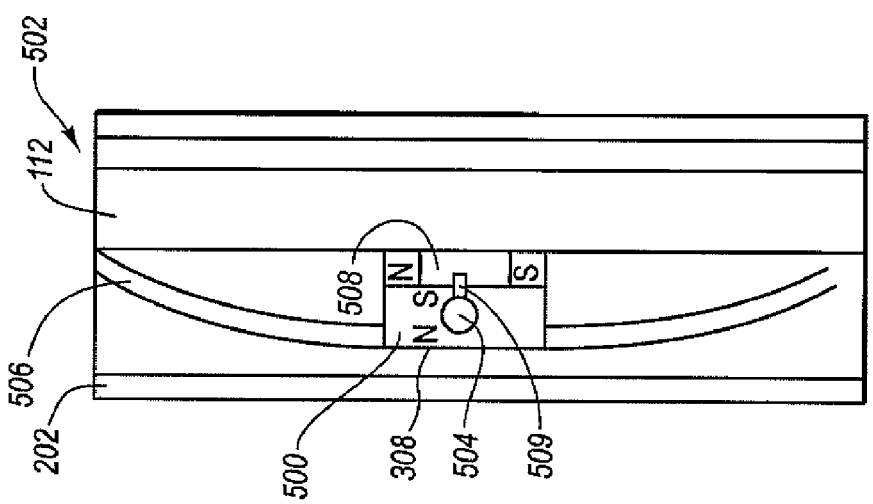
FIG. 5A is a diagrammatical section of a downhole survey tool with a clamp in a first position according to another embodiment.

Another clamp 500 embodiment is shown in FIGS. 5A-5C. FIGS. 5A and 5B illustrate a downhole survey tool 502, and the clamp 500 may include a bias member such as a bow spring 506. The survey tool 502 also includes the sensor package 308 attached to a conveyance, such as the wireline 112, by the bow spring 506. The clamp 500 may also include a first magnet 508 affixed to the wireline 112 and a second magnet 504 included with the sensor package 308. The clamp 500 may also include a locking mechanism such as a shear pin 509 between the sensor package 308 and the first magnet 508.

FIG. 5A illustrates a first or retracted position for the clamp 500 and the sensor package 308. In the first position shown in FIG. 5A, the second magnet 504 is arranged with its poles generally perpendicular to the poles of the first magnet 508. Accordingly, there may be a magnet attraction, a neutral force, or even a small repelling force between the first and second magnets 508, 504. However, in the first position, the shear pin 509 attaches the sensor package 308 to the first magnet 508 (or the wireline 112 or other conveyance).

However, when the clamp 500 is actuated, the sensor package 308 tends to move radially away from the wire line 112 as shown in FIG. 5B. The sensor package 308 may be acoustically coupled to the casing 202 when the clamp 500 is activated. The clamp 500 may be activated, for example, by rotating the second magnet 504 to an orientation with respect to the first magnet 508 to a position that generates a repelling force sufficient to shear the shear pin 509. FIG. 5C illustrates in detail one orientation of the first and second magnets 508, 504 wherein the poles of each magnet are aligned generally parallel to one another to generate a repelling force on the sensor package 308 in the direction of arrow 507 sufficient to overcome the shear strength of the shear pin 509.

The sensor package may be retracted by the clamp 500 into the first position of FIG. 5A when, for example, the survey tool 502 is deployed, retracted, or otherwise moved. The second magnet 504 may be oriented to generate an attraction force with the first magnet 508 to collapse the bow spring 506 in the first position (if the shear pin 509 has already been broken). In some embodiments, however, there may be a protective sheath removably mounted over the bow spring 506 during deployment, and in some embodiments the shear pin 509 may be omitted.

In some embodiments, when the survey tool 502 has entered a cased borehole and reached a desired depth, the second magnet 504 on the sensor package 308 is actuated (e.g. via the actuator control line 412 (FIG. 4B)). The clamp 500 is actuated and the second magnet 504 changes or reverses polarity, breaking the shear pin 509, and releasing the tension in the bow spring 506. The sensor package 308 is clamped to the casing 202 when the clamp 500 is actuated by a combination of magnetic and spring forces. Likewise, the sensor package 308 may be retracted by deactivating the clamp 500 and changing or reversing the polarity of the second magnet 504 to generate an attraction force.

Figure 6B:
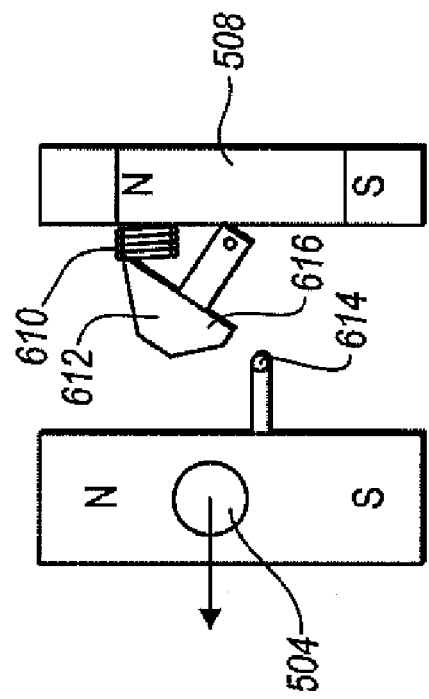
FIG. 6B is an enlarged view of the locking mechanism of FIG. 6A in a second position.
Figure 6A:
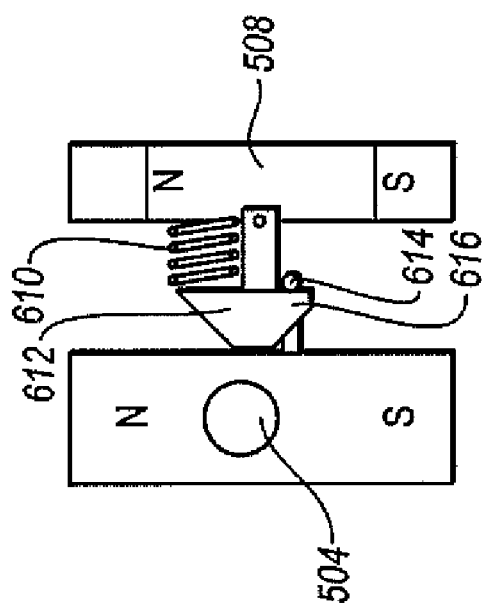
FIG. 6A is an enlarged view of another locking mechanism in a first position that may be used with the clamp of FIGS. 5A and 5B (or others) according to one embodiment.

Another locking mechanism that may be used with the clamp 500 is illustrated in FIGS. 6A and 6B. Unlike the shear pin 509 arrangement of FIG. 5C, the locking mechanism of FIGS. 6A and 6B may be reciprocated. In the embodiment of FIGS. 6A and 6B, the shear pin 509 (FIG. 5C) is replaced by a spring 610, a rotating hammer 612, and a locking bar 614. When the sensor package 308 (FIG. 5A) is in the first position shown in FIG. 5A, the spring 610 is released, forcing a head 616 of the hammer 612 into contact with the locking bar 614. The hammer 612 and the locking bar 614 may hold the sensor package 308 in the first position until the second magnet 504 rotates and a repulsion force between the first and second magnets 508, 504 is sufficient to overcome or compress the locking force of the spring 610 holding the hammer 612 in engagement with the locking bar 614 as shown in FIG. 6B.

Figure 7A:
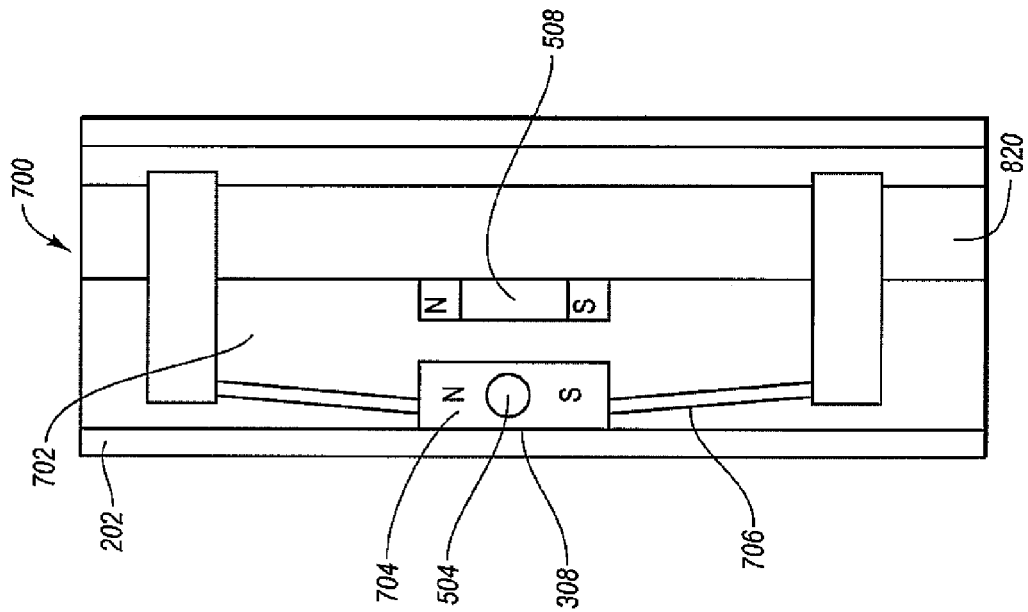
FIG. 7A is a diagrammatical section of another downhole survey tool with a clamp in a first position according to one embodiment.
Figure 7B:
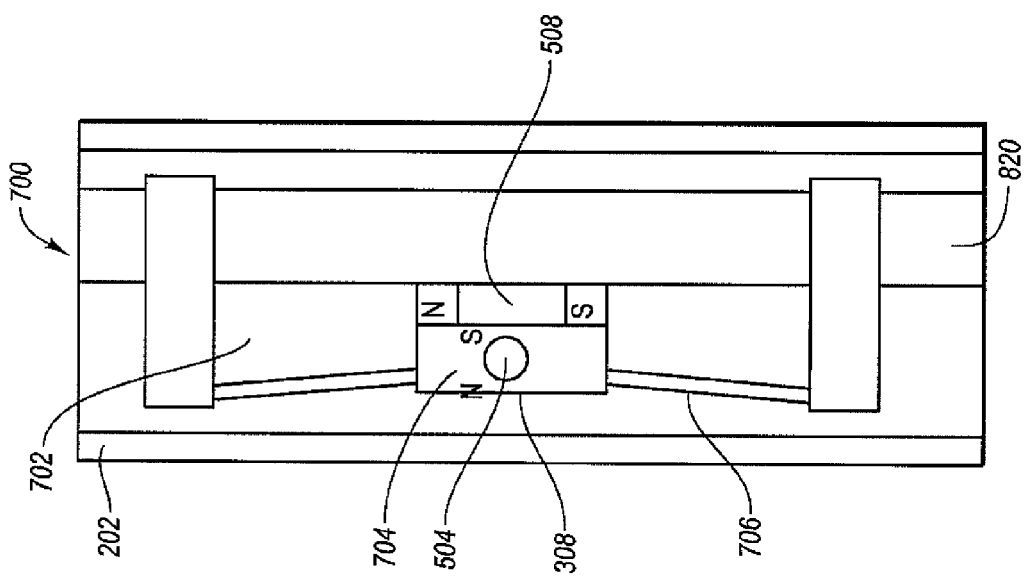
FIG. 7B is a diagrammatical section of the downhole survey tool and clamp of FIG. 7A in a second position.

Another embodiment for a downhole survey tool 700 with a clamping mechanism is shown in FIGS. 7A and 7B. In the embodiment of FIGS. 7A and 7B, the survey tool 700 includes a recess 702 receptive of the sensor package 308. A clamp 704 may include a bias member such as a double-action bow spring 706. Similar to the embodiment of FIGS. 5A-5C, the sensor package 308 of the survey tool 700 is attached to a conveyance such as coiled tubing 820 by the double-action bow spring 706 having suitable attachment clamps at either end as depicted in FIGS. 7A and 7B. The clamp 704 may also include the first magnet 508 affixed to the coiled tubing 820 and the second magnet 504 included with the sensor package 308.

The double-action bow spring 706 facilitates two sensor package 308 positions. The double-action bow spring 706 tends to one of two low energy positions. The first position is shown in FIG. 7A wherein the sensor package is retracted in the cavity 702 toward the coiled tubing 820. The second magnet 504 is arranged to generate an attractive force with the first magnet 508 when the second magnet 504 is oriented as shown in FIG. 7A. However, the clamp 704 may be activated and the second magnet 504 may be rotated to a second position shown in FIG. 7B. The second position of the second magnet 504 generates a repelling force between the first and second magnets 508, 504 sufficient to move the double-action bow spring 706 and the sensor package radially outward. When the double-action bow spring 706 crosses a certain point moving radially outward, it automatically springs out or moves to the second low energy position shown in FIG. 7B. The second position clamps the sensor package 308 to the casing 202 or borehole wall, acoustically coupling the sensor package 308 to an adjacent formation. The clamp 704 may be deactivated to re-orient the second magnet 508 again and force a retraction of the double-action spring 706 and thus the sensor package 308. The bow spring mechanism of FIGS. 7A and 7B may be configured to function as an acoustic isolator based on the principles described above in connection with FIGS. 3A and 3B.

Another embodiment for a downhole survey tool 800 with a clamping mechanism is shown in FIGS. 8A-8C. The embodiment of FIGS. 8A-8C illustrates the shuttle 204 and sensor package 308 embedded in the wire line 112. The sensor package 308 is initially embedded within the wire line 112 by a mold 802. Radially interior of the mold 802 is a stress core 804 and a connector 805. Conductors 806 pass through the shuttle 204. As depicted in FIGS. 8A-8B, the mold 802, stress core 804, and connector 805 attach the wire line 112 to the shuttle 204. The shuttle 204 houses the first magnet 508. The sensor package 308 is attached to the shuttle 204 by a bow spring mechanism 816. FIG. 8A illustrates the bow spring mechanism 816 in a first or collapsed position with the sensor package 308 cradled within the shuttle 204. The bow spring mechanism 816 is collapsed by the attractive forces between the first magnet 508 and the second magnet 504 in the same manner shown in FIGS. 7A-7B. FIG. 8B illustrates the sensor package 308 in a second position extended radially outward from the shuttle 204, which may establish a coupling interface between the sensor package 308 and the borehole casing 202. FIG. 8C illustrates an end-view cross-section of the embodiment of FIGS. 8A and 8B. The bow spring mechanism of FIGS. 8A-8C may be configured to function as an acoustic isolator based on the principles described above in connection with FIGS. 3A and 3B.

Figure 9:
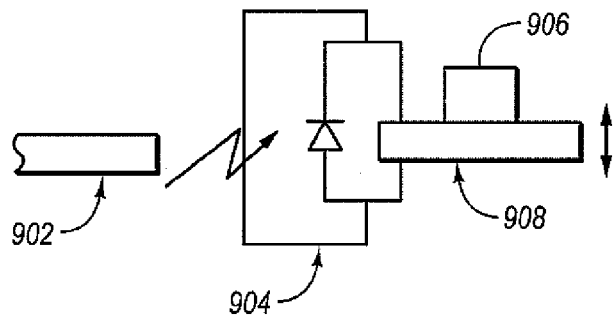
FIG. 9 is a schematic illustration of a downhole fiber optic sensor arrangement according to one embodiment.

As mentioned above, some embodiments may include downhole optical sensors and associated optical communication fibers. FIG. 9 is a schematic representation of an optical communication fiber 902 linked to an optical electronics converter 904. The optical electronics converter 904 is communicably linked to a fiber optic seismic sensor 906, which may be calibrated by a transducer or transducers 908. The transducers 908 may comprise piezoelectric transducers or electromagnetic transducers. The fiber optic seismic sensor 906 may be calibrated downhole without downhole power supplies or other complicated downhole electronics according to some embodiments.

For example, the fiber optic seismic sensor 906 may be calibrated by providing an uphole light source. The uphole light source transmits light via the optical communication fiber 902. Photo detectors of the fiber optic seismic sensors 906 produce a modulated photo current, which activates the transducers 908. The transducers 908 are acoustically coupled to and excite the fiber optic seismic sensors 906. By providing a known input signal and expected response, the fiber optic seismic sensor 906 are calibrated. The same or different optical communication fibers 902 may be used for measurement and calibration signals. In addition, one embodiment may include a downhole capacitor to power the transducers 908. Opti-electric converters may charge the capacitor from light transmitted along the optical communication fiber 902.

Figure 10:
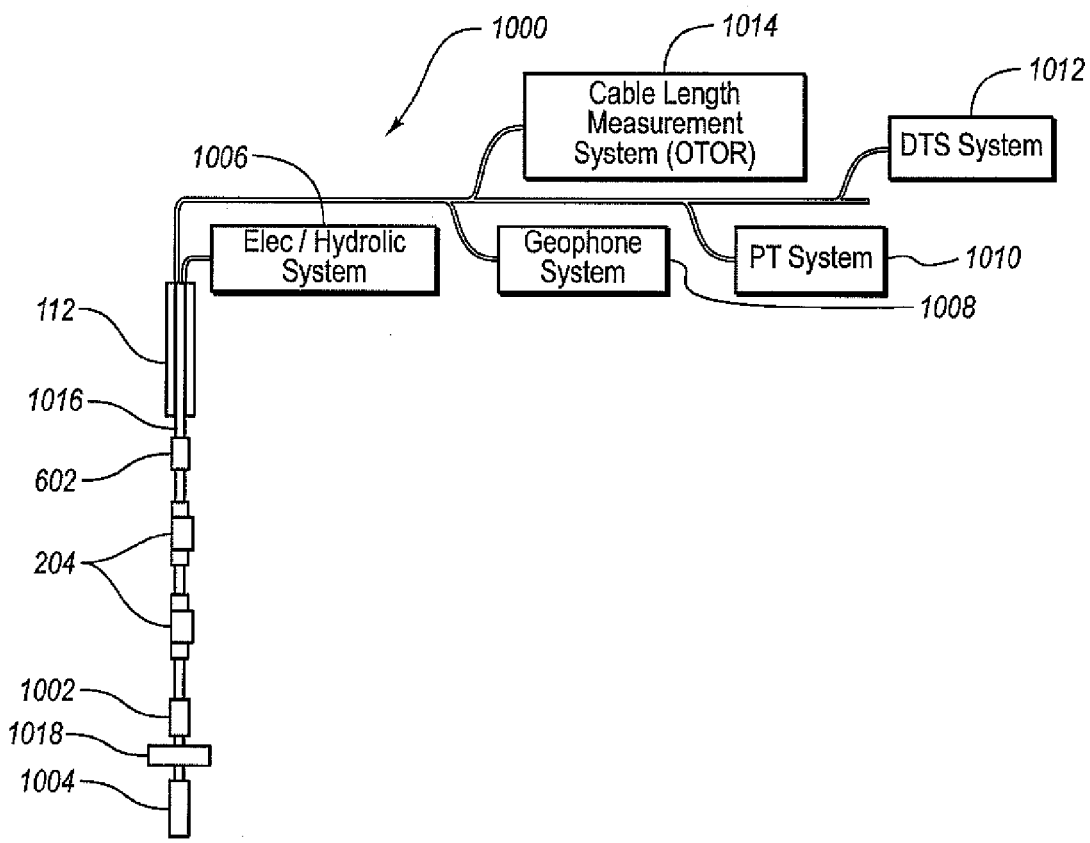
FIG. 10 is a functional diagram of a borehole seismic sensing system according to one embodiment.

FIG. 10 is a functional diagram of one embodiment of a borehole seismic sensing system 1000. The system 1000 includes a plurality of shuttles 204 along the wire line 112, each of which contains a sensor package (e.g. sensor package 308 in FIG. 7A). Other sensors may also be attached along the wire line 112, such as the pressure/temperature (P/T) sensors 1002 shown in FIG. 10. The wire line 112 can be adapted to carry various communication lines, including fiber optic sensor array communication lines for a fiber optic system. The wire line 112 can also be adapted to carry a hydraulic line or electrical line actuator to control actuation of one of the magnetic clamps described above. Also shown in FIG. 10 is a downhole battery 1004 that can be utilized to support various power needs. Various monitoring and control systems can be located at the surface such as an actuator control system 1006 which controls actuation of the magnet clamp(s). A borehole sensor system 1008 monitors, stores, and interprets the data output from the downhole seismic sensors (e.g. from the sensor package 308 in FIG. 7A). Also, a P/T sensor system 1010 may be located at the surface to monitor down-hole pressure and temperature. One embodiment may include a distributed temperature sensor 1016, which is communicably linked to a distributed temperature sensor (DTS) system 1012 for providing a continuous temperature profile. Also, the system 1000 may include a cable length measurement system such as an Optical Time Domain Reflectometer (OTDR) system 1014 as shown. An electrical cartridge 1018 is shown on the wire line 112 below the sensor section.

Figure 11A:
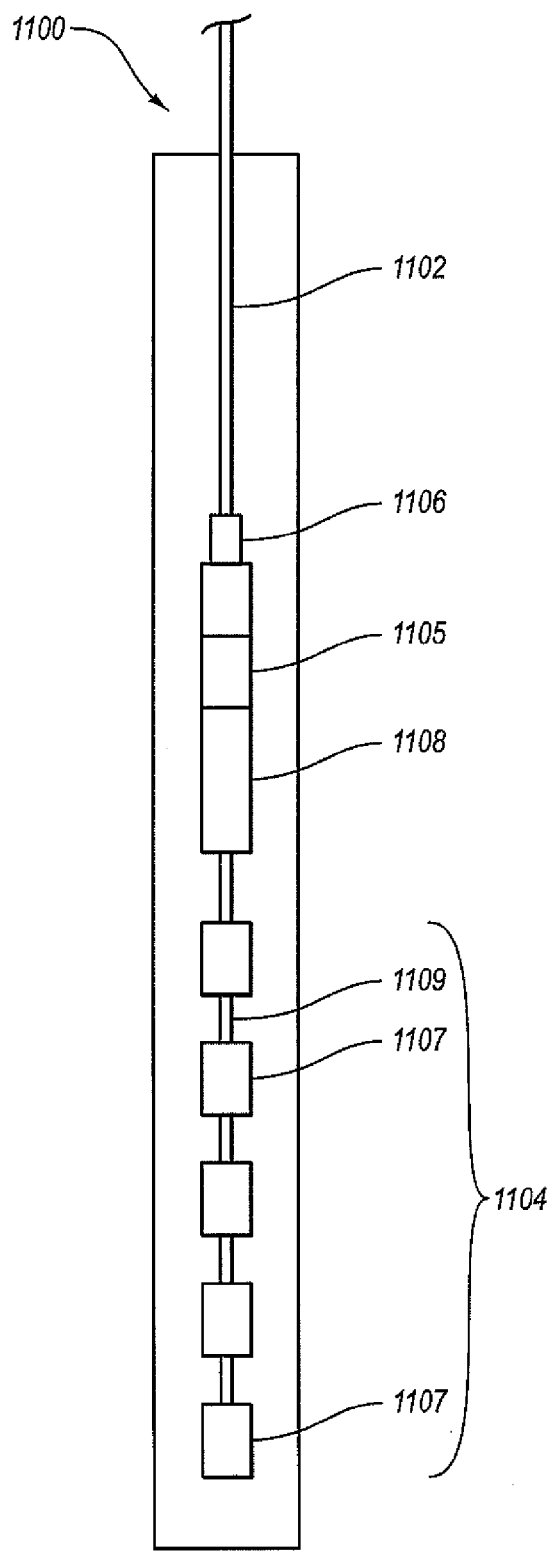
FIG. 11A illustrates a conventional wire line tool system.
Figure 11B:
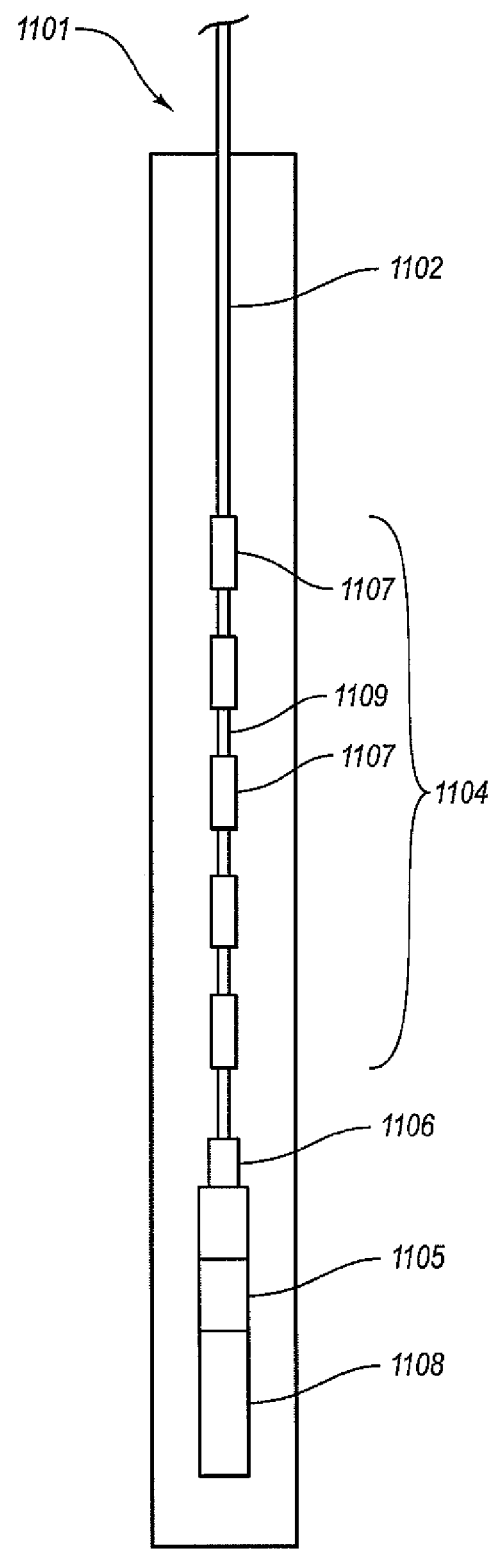
FIG. 11B is a wire line tool system arrangement according to one embodiment of the present invention.

Turning away now from systems and tools that may specifically include downhole clamping systems, FIGS. 11A and 11B illustrate general arrangements of borehole conveyance system tools, for example wire line acoustic logging systems or tools 1100 and 1101. FIGS. 11A and 11B illustrate differences between a conventional wire line acoustic logging system 1100 and one wire line acoustic logging system 1101 according to an embodiment of the present invention. Each wire line acoustic logging tool 1100, 1101 includes a wire line cable 1102, a sensor or sensor array 1104, a logging head 1106, and an acquisition electronics section 1108 (which may include a telemetry cartridge 1105, and may also comprise the logging head 1106). The acquisition electronics section 1108 may comprise a weight. In the conventional wire line acoustic logging system 1100, the sensor array 1104 is arranged distal of the acquisition electronics section 1108. The sensor array 1104 is relatively light. Therefore, if the sensor array 1104 encounters resistance in a borehole, there is little weight to pull the sensor array 1104 past the encumbrance. If the sensor array is encumbered, typically it will collapse on itself as the acquisition electronics section 1108 is advanced (interconnecting cables 1109 collapse in compression). However, the proximal location of the acquisition electronics section 1108, and hence the logging head 1106, allows conventional fishing tools to grab the logging head 1106 and retrieve the acoustic logging tool 1100 if it gets stuck. Nevertheless, the conventional arrangement of the acoustic logging tool 1100 of FIG. 11A does not provide any downward pull to the sensor array 1104 (other than the weight of shuttles 1107 themselves) may be prone to getting stuck.

On the other hand, according to the embodiment of FIG. 11B, the acquisition electronics section 1108 is disposed on the wire line cable 1102 distal of the sensor array 1104. The distal arrangement of the heavier acquisition electronics section 1108 as shown in FIG. 11B provides additional downward force to pull the sensor array 1104 through the borehole and past any encumbrances. However, it may be more difficult to fish out the acoustic logging tool 1101 according to the arrangement of FIG. 11B if it does become stuck. In the embodiment of FIG. 11B, the logging head 1106 is distal of the sensor array 1104, rather than at a top of the acoustic logging tool 1101. Therefore, in the embodiment of FIG. 11B, the shuttles 1107 of the sensor array 1104 may be of reduced or relatively small diameter as compared to the conventional arrangement of FIG. 11A. The shuttle 1107 may even be flush or substantially flush with and/or embedded in the wire line cable 1102 (e.g. the arrangement shown in FIGS. 8A-8C), facilitating the advance of a hollow fishing tool (such as a fishing tool 1200 described in more detail below with reference to FIGS. 12A-12B) past the sensor array 1104 to gain access to the logging head 1106. The unique arrangement for the acoustic logging tool 1101 shown in FIG. 11B is not motivated or suggested by prior systems because, among other reasons, conventional fishing tools may not be capable of fishing out the tool without at least damaging the sensor array, and perhaps not at all.

Figures 12A, 12B:
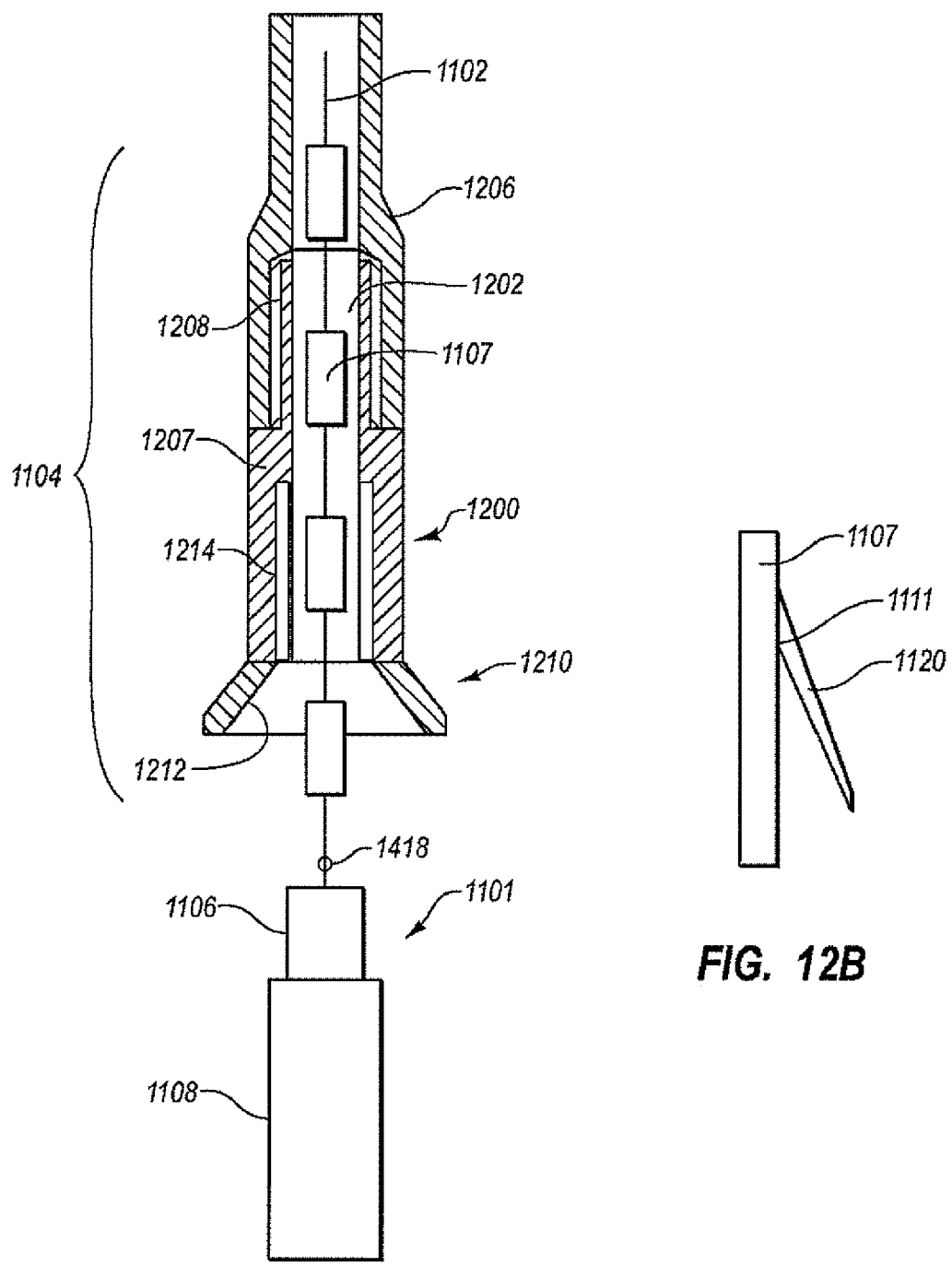
FIG. 12A is a cross-sectional view of a fishing tool in proximity to a survey tool logging head according to one embodiment.
FIG. 12B is a side view of a sensor package and locking arm according to one embodiment.

The sensor array 1104 and the shuttles 1107 in the arrangement of FIG. 11B have a smaller outer diameter than the outer diameter of the logging head 1106 so that the fishing tool or overshoot 1200 shown in FIG. 12A can feed over or run over the sensor array 1104. The shuttles 1107 having sensor packages are attached along the wire line cable 1102 of the tool 1101. The logging head 1106 may be sized to fit into the fishing tool 1200 as described below. The remainder of the acquisition electronics section 1108 may have a larger overall diameter than an inner diameter of the fishing tool 1200.

According to the embodiment of FIG. 12A, the fishing tool 1200 comprises a hollow mandrel 1207 with an internal passage 1202 capable of sliding over the wire line cable 1102 and over the sensor array 1104. The internal passage 1202 has a diameter large enough to feed over the sensor array 1104 and the shuttles 1107 without damaging the array.

Each shuttle 1107 may have one or more locking arms 1120 pivotally attached thereto as shown in FIG. 12B. The locking arms 1120 are attached to the shuttle at a shear pin 1111. The locking arms 1120 may be arranged on one side of the shuttle 1107 and, when actuated as shown, tend to move the shuttle 1107 toward a casing or borehole wall (in FIG. 12B, the locking arm 1120 tends to push the shuttle 1107 to the left). The shear pin 1111 ensures that the locking arm 1120 does not create a significant obstruction—if the locking arm catches on anything, a relatively small force will break the shear pin 1111 and release the shuttle 1107. In some embodiments, the locking arm 1120 may be extended and retracted as desired (electrically, hydraulically, or otherwise) to move the shuttle 1107 or the sensor package into and out of acoustic engagement with a casing or borehole wall.

Figures 13A, 13B:
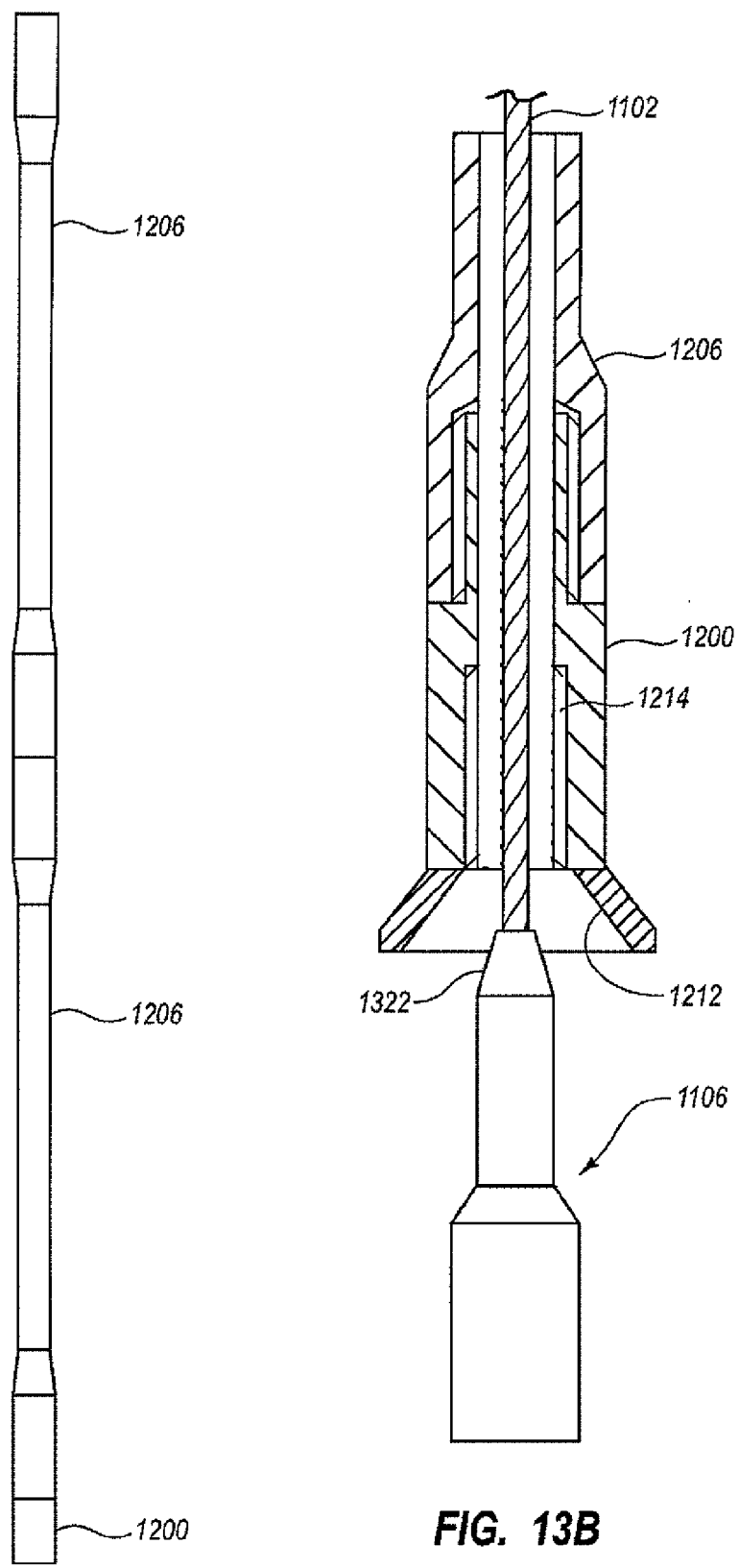
FIG. 13A is a side view of two segments of drill pipe connected to a fishing tool according to one embodiment.
FIG. 13B is a cross section of a portion of the drill pipe and fishing tool of FIG. 13A in proximity to a stuck logging tool.

A first end 1208 of the fishing tool 1200 may be attachable to a drill pipe 1206. The drill pipe 1206 advances the fishing tool 1200 to the logging head 1106. FIG. 13A illustrates two joints of drill pipe 1206 attached to the fishing tool 1200. A second end 1210 of the fishing tool 1200 may comprise an open-mouth taper 1212. The open-mouth taper 1212 guides the fishing tool 1200 over the logging head 1106. In addition, the logging head 1106 as shown in the embodiment of FIG. 13B may include a tapered end 1322 that also guides the fishing tool 1200 thereover.

A grabbing mechanism 1214 is arranged inside the internal passage 1202 at the second end 1210. In one embodiment, the grabbing mechanism 1214 comprises a plurality of barbed teeth. The barbed teeth of the grabbing mechanism 1214 allow the internal passageway 1202 to slide over the logging head 1106 as the fishing tool 1200 is advanced toward the acoustic logging tool 1101, but grabs the logging head 1106 and will not release when the fishing tool 1200 is retracted. Therefore, if the acoustic logging tool 1101 is stuck in a borehole, the fishing tool 1200 may be attached to the drill pipe 1206 and fed over the wire line cable 1102 and the sensor array 1104 until the grabbing mechanism 1214 engages the logging head 1106. The fishing tool 1200 grabs the logging head 1106, and the drill pipe 1206 may be retracted, retrieving with it the acoustic logging tool 1101.

In some cases, rather than feeding the fishing tool 1200 over the wire line cable 1102 and the sensor array 1104, the wire line cable 1102 and/or the sensor array 1104 may first be detached from the logging head 1106 prior to a retrieval operation. Therefore, in some embodiments, including the embodiments shown in FIGS. 12A and 14, there is a weak spot or predetermined break point 1418 between the sensor array 1104 (FIG. 12A) and the logging head 1106. The wire line cable 1102 may be pulled when the acoustic logging tool 1101 becomes stuck until the predetermined break point 1418 fails, after which the wire line cable 1102 can be retracted uphole and the fishing tool 1200 sent downhole.

Figure 15:
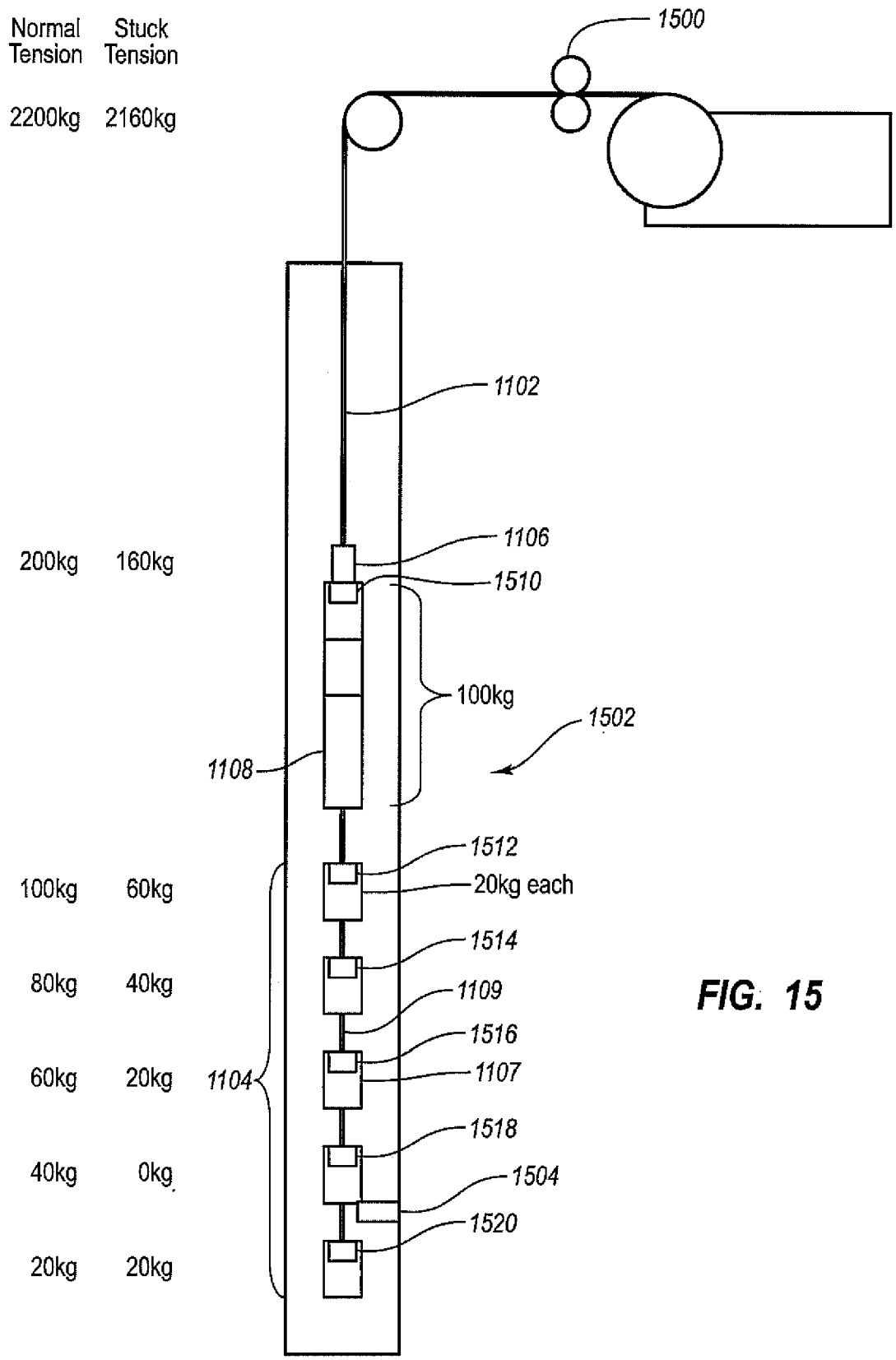
FIG. 15 is a schematic of a survey system with a downhole tension meter according to one embodiment.

Referring to FIG. 15, one of the difficulties encountered with acoustic logging tools is determining when the logging tools, and specifically the shuttle or sensors, encounter an obstruction. Therefore, it is not uncommon to include a tension meter 1500 uphole when an acoustic logging tool 1502 is deployed into a borehole. The tension meter 1500 typically measures an uphole total tension value (for example in kilograms force or pounds force) as the acoustic logging tool 1502 is deployed. The measured tension increases with the length (and therefore the weight) of the wire line cable 1102. As the depth of the acoustic logging tool 1502 increases, the weight of the wire line cable 1102 dominates and it becomes very difficult to determine by an uphole tension measurement when any portion of the acoustic logging tool 1502 becomes stuck (for example on obstacle 1504).

Therefore, according to some embodiments, the acoustic logging tool 1502 itself may include one or more tension meters capable of reporting a measured tension value (for example, while downhole). FIG. 15 illustrates the benefits of tension measurement local to the acoustic logging tool 1502. According to the exemplary implementation of FIG. 15, the acoustic logging tool 1502 comprises the acquisition electronics section 1108 weighing, for example, 100 kg. In addition, the sensor array 1104 may include five shuttles 1107, each of which (with their associated interconnecting cables 1109) weighing, for example, approximately 20 kg. The wire line cable 1102 weighs approximately 2000 kg at the length shown in FIG. 15. The combined weight of the wire line cable 1102 and the acoustic logging tool 1502 in FIG. 15 would normally be 2200 kg. Accordingly, under normal conditions (nothing stuck), the tension meter 1500 at the surface would read approximately 2200 kg. If, however, one of the shuttles 1107 happened to get stuck on the obstacle 1504, the obstacle 1504 may bear the weight of one or more shuttles 1107 and the tension at tension meter 1500 would theoretically decrease by the amount borne by the obstacle 1504. In the embodiment of FIG. 15, one shuttle 1107 is stuck on the obstacle 1504 and the obstacle 1504 bears the entire weight (40 kg) of the two most distal shuttles 1107. The tension meter 1500 should read approximately 2160 kg when the obstacle bears the weight of the last two shuttles 1107. Nevertheless, the precision of the tension meter 1500 when weights increase (and are dominated by the weight of the wire line cable 1102) is generally not high enough for an operator to quickly notice when a part of the acoustic logging tool 1502 gets stuck. That is to say, the incremental difference between a normal tension of 2200 kg and a stuck tension of 2160—in a dynamic system while the acoustic logging tool 1502 is being lowered and tension is constantly increasing—is difficult or impossible to detect conventionally. Further, the difficulty increases with increasing depth and longer lengths of cable.

However, according to some embodiments, tension measurements local to the acoustic logging tool 1502 do not change with increasing depth and may be easily detected. For example, in one embodiment, the logging head 1106 comprises a first tension meter 1510 capable of reporting a measured tension uphole. Under normal conditions for the exemplary weights shown in FIG. 15, the first tension meter 1510 at the logging head 1106 will measure a relatively constant 200 kg. When one of the shuttles 1107 gets stuck on the obstacle 1504 and the obstacle 1504 bears the weight of the final two shuttles 1107, the first tension meter 1510 measures approximately 160 kg. The incremental difference between 200 kg and 160 kg is significant and easily detectable and may very quickly indicate to an operator that at least a portion of the acoustic logging tool 1502 is stuck. The tension meter 1510 at the logging head 1106 (and/or other downhole locations) reports certain fixed weights or tensions when the tool 1502 is descending. If the tool 1502 stops descending, the tension meter 1510 signals a change and the operator can stop spooling (or a computer that controls a winch may stop spooling) the wire line cable 1102. If an operator can quickly stop spooling when something gets stuck, there is a much smaller chance of the wire line cable 1102 tangling over the shuttles 1107.

Moreover, even more pronounced relative changes in tension may be detected by including other or different distributed tension meters at the acoustic logging tool 1502. For example, as shown in FIG. 15, in one embodiment there may be a tension meter 1512, 1514, 1516, 1518, 1520 at each of subsequent shuttles 1107. As shown in FIG. 15, to the left of the sensor array 1104 are the tensions measured at each tension meter under normal and stuck conditions. As shown, when the penultimate shuttle 1107 is stuck on the obstacle 1504, the tension meter 1518 at the stuck shuttle 1107 will change from a measurement of approximately 40 kg down to 0 kg. Each of the other local tension meters measures a similar change in tension. Including the tension meters 1510, 1512, 1514, 1516, 1518, 1520 at various locations along the acoustic logging tool 1502 not only facilitates detection of a stuck tool, but also where or what part of the acoustic logging tool 1502 is stuck. The 0 kg reading by tension meter 1518 may give an operator clear indication of where the acoustic logging tool 1502 is stuck.

If the operator or a computer recognizes that a portion of sensor array 1104 is not descending, it is possible to stop spooling and possibly pull the acoustic logging tool 1502 out of the borehole with everything intact. Further, if a distributed tension sensor (such as tension meters 1512-1520) indicates a value that is lower than a value when the array is stationary, then the operator or a computer may recognize that the shuttles 1107 downhole of the low-sensing tension meter are receiving higher drag. In such a circumstance, the operator or computer can reduce spooling speed and avoid small or unusual borehole anomalies that might otherwise totally obstruct or trap collapsing shuttles if descending at a higher speed.

When the descending speed of the acoustic logging tool 1502 is accelerated, the distributed tension is reduced until the descending tool 1502 reaches a constant velocity. Monitoring the distributed tension meters' measured values allows positive tension to be maintained. A negative tension would indicate that the wire line cable 1102 may be pushing a shuttle 1107 down, which may result in tangling. Currently it is unlikely that an operator would have any idea when the shuttles 1107 begin to collapse on each other, but by applying principles described herein he can greatly reduce the chance of tangling during deployment. During a deployment of the acoustic logging tool 1502, the speed of decent may be controlled manually or automatically according to monitored tension. If tension falls, the deployment speed can be reduced. If tension measurements reach zero or become negative, the winch may be stopped. Further, if the acoustic logging tool 1502 is stuck, the distributed tension meters 1512-1520 may indicate where the tool is stuck, especially if the tool is pulled up from surface. Measured tension above the stuck point indicates full tension. The tension sensor below the stuck point, on the other hand, will indicate no change in tension even after the tool is pulled.

Figure 16A:
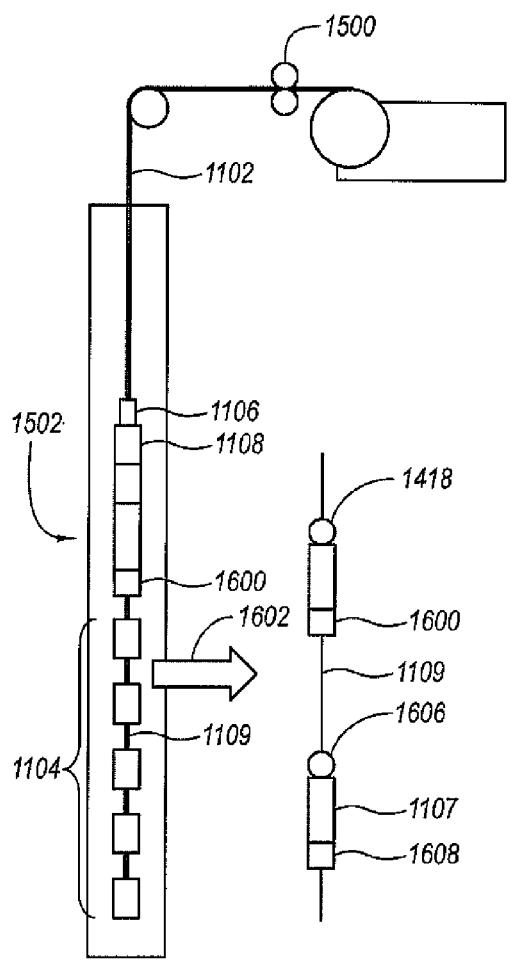
FIG. 16A illustrates predetermined weak points and tension meters in an acoustic survey tool according to one embodiment.

Downhole tension meters on the logging tools may be implemented for various tool arrangements in any number and in any configuration (including the configuration of FIG. 11B). One downhole tension meter or many downhole tension meters may be used with or without an uphole tension meter. As shown in FIG. 16A, in some embodiments the acoustic logging tool 1502 includes one or more tension meters and is arranged with the proximal acquisition electronics section 1108 and the distal sensor array 1104. In the embodiment of FIG. 16A, a tension meter 1600 is arranged at a distal end of the acquisition electronics section 1108 and at each shuttle 1107. An arrow 1602 points to a magnified potential configuration of the tension meter 1600 in relation to the weak point 1418 between the acquisition electronics section 1108 and the sensor array 1104. The weak point 1418 may facilitate separation of the acquisition electronics section 1108 from the sensor array 1104 if a component of the sensor array 1104 is stuck. Likewise, there may be a weak point 1606 between adjacent shuttles in the interconnect cable 1109 and a tension meter 1608 at each shuttle 1107.

Figure 16B:
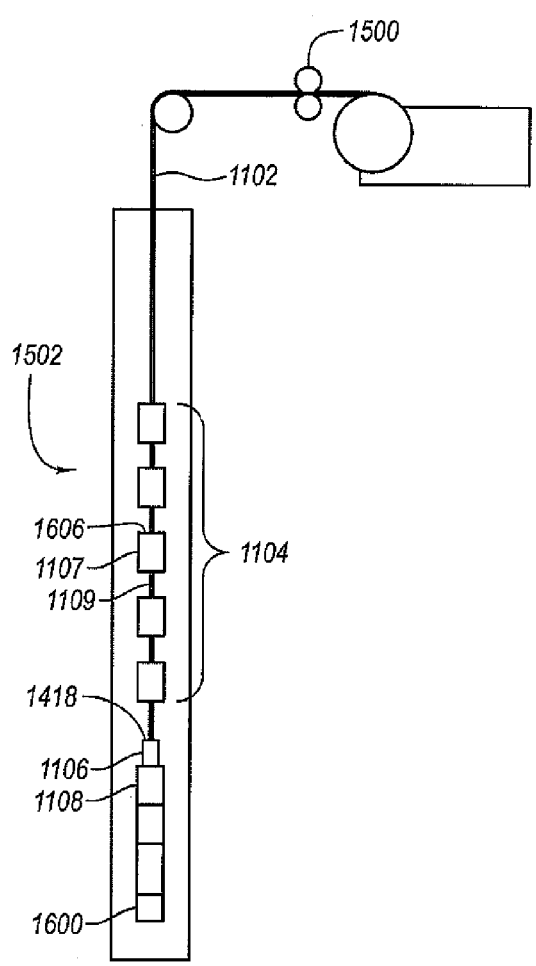
FIG. 16B illustrates an acoustic survey tool arrangement with predetermined weak points according to another embodiment.

The one or more downhole tension meters may also be used in the opposite arrangement shown in FIG. 16B wherein the sensor array 1104 is proximal of the acquisition electronics section 1108. Each weak point 1606 may be actively cut in some embodiments by sending a command from surface to, for example, inject a current and cause chemical etching. Further, each weak point 1418, 1606 may be designed for a specified strength—such as arranging the strongest proximally and weakest located distally—so that over-pulling always breaks the weak point nearest to the bottom (or just above a stuck point). In such circumstances, information related to where the tool is stuck may not be needed, as there may always be a weak point just above the stuck point, which will always break by over-pulling. The multiple weak point arrangement described above may be useful for slick-line operation.

Figure 14:
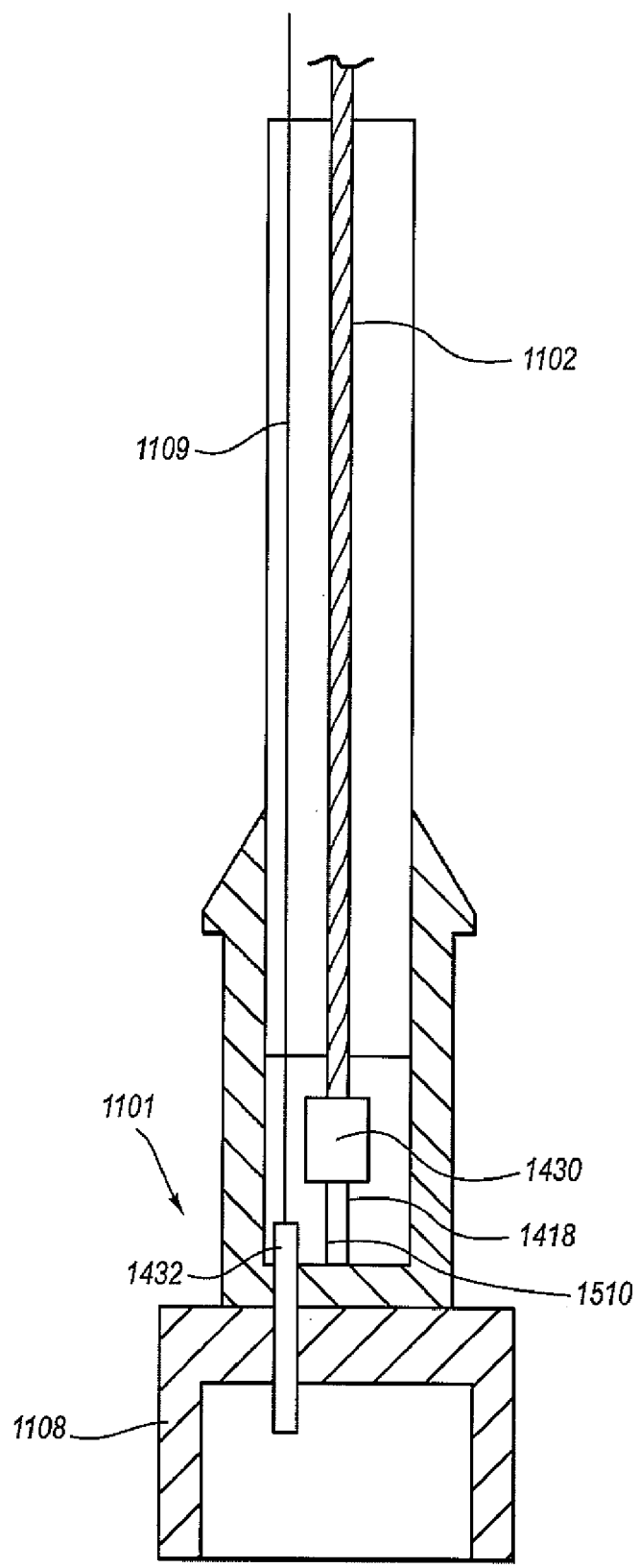
FIG. 14 is a partial cross section of a logging head portion of a survey tool according to one embodiment.

Returning to FIG. 14, some additional details of the logging head 1106 of the acoustic tool 1101 are shown according to one embodiment. The wire line cable 1102 comprises a strength member that will not normally break. The wire line cable 1102 ends at a cable strength termination 1430. The weak point 1418 is adjacent to the cable strength termination 1430 and will break upon the application of a predetermined force or tension and allow the wire line cable 1102 to be retracted in the event the tool 1101 become stuck. The tension meter 1510 may also be located at the weak point 1418. FIG. 14 also illustrates the interconnecting cable 1109 that facilitates communication uphole. A feedthru, for example an electrical feedthru 1432 facilitates passage of the interconnecting cable 1109 into and through the logging head 1106 and the remainder of the acquisition electronics section 1108.

Figure 17:
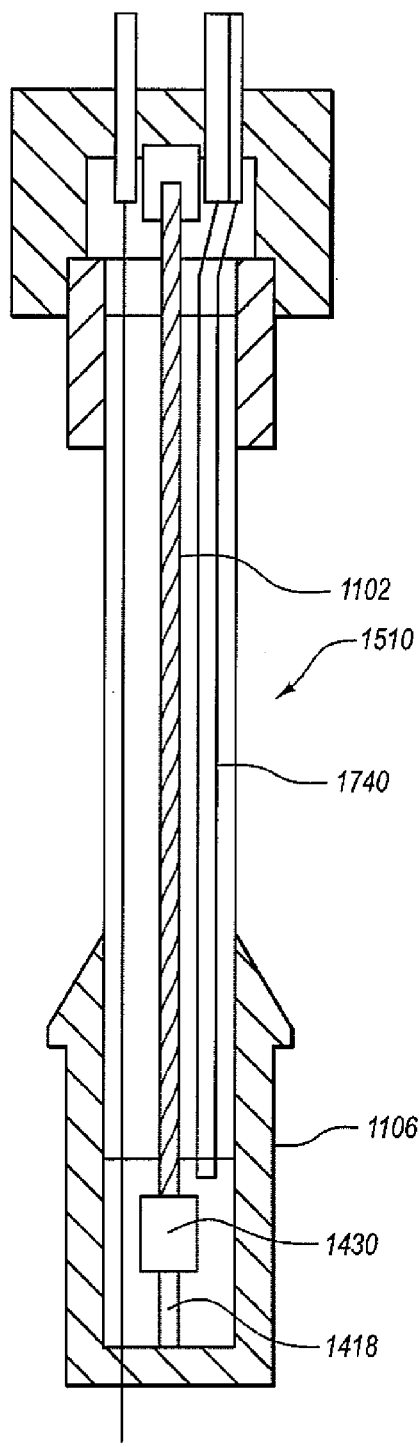
FIG. 17 is a cross-sectional view of a tension sensor according to one embodiment.

The tension meter 1510 (and the downhole tension meters mentioned above) may comprise any apparatus capable of measuring and reporting a tension, strain, or weight value or difference. For example, FIG. 17 illustrates one arrangement for the tension meter 1510. According to the embodiment of FIG. 17, the tension meter 1510 comprises a conductor 1740 arranged along the wire line cable 1102. Electrical resistance through the conductor 1740 changes when the conductor 1740 is elongated or shortened. It is well known that the change in resistance due to change in the length of the conductor 1740 may be calibrated to measure and report tension. The tension meter 1510 between the wire line cable 1102 and logging head 1106 may monitor the relationship between a fishing tool such as overshot fishing tool 1200 (FIG. 12A) and the logging head 1106. When the drill pipe 1206 (FIG. 12A) is advanced to the point of latching the fishing tool 1200 on to the logging head 1106, a change in tension is measured and reported by the tension meter 1510, and an operator knows he can halt the drill pipe advance and instead retract and retrieve the stuck acoustic sensor tool 1101.

Figure 18:
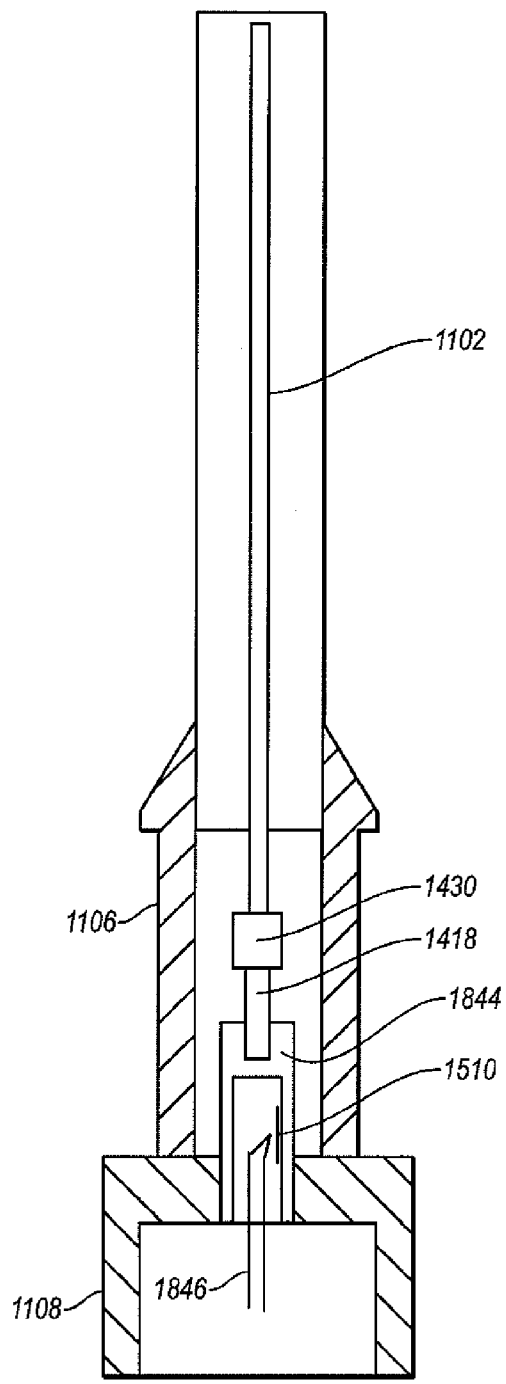
FIG. 18 is a cross-sectional view of a tension sensor according to another embodiment.

The tension meter 1510 may be exposed to and sensitive to well conditions. Therefore, according to another embodiment illustrated in FIG. 18, the tension meter 1510 may be wired from a pressure protected housing 1844. The pressure protected housing 1844 sees tension at the logging head 1106 and a communication or wire connection 1846 from the tension meter 1510 may interface with appropriate measurement electronics in the acquisition electronics section 1108. According to the embodiment of FIG. 18, there is no need for feed-thrus to bring a wire or other communication connection through a pressure-tight housing. The tension meter 1510 is protected from pressure and other well conditions.

INDUSTRIAL APPLICABILITY

The present specification has applicability for both performing borehole surveys for planning well bore drilling and production and for monitoring borehole data during actual well production. Such borehole surveys include borehole seismic surveys and such monitoring of borehole data includes temporary or permanent monitoring. One embodiment comprises a plurality of the shuttles comprising borehole sensors attached along a cable line and spooled down the borehole for permanent or temporary monitoring of seismic data. The plurality of borehole sensor arrays that are attached along the wire line enables the system to record simultaneous multi-level acquisition seismic data. One embodiment utilizes a plurality of these seismic sensor arrays each housed in a plurality of shuttles having acoustic isolation and magnetic clamping capabilities. One embodiment utilizes fiber optic geophone technology. Fiber optic technology has the ability to multiplex multiple channels at a high data rate, thereby satisfying the demand for acoustic and seismic imaging applications which require a large sensor array with high data transmission capabilities Use of fiber optic technology in certain embodiments also allows for a greater number of shuttles because of the smaller profile, lighter weight and the fact that no downhole electronics or power from the surface is required.

One embodiment is operable to spool downhole a wire line or coiled tubing conveyance having a plurality of shuttle sensor packages spaced along the conveyance. Shuttles can be optionally embedded in the conveyance as shown above. The sensors can optionally all be attached in a conveyance sensor section as shown in FIGS. 11A and 11B. In the arrangement shown in FIG. 11B, the sensor array 1104 may be proximal of the larger components such as main electronic units, battery units, and weights. Placing larger or heavier components below the smaller diameter sensor array 1104 may facilitate advancing of the sensor array 1104 into a borehole. As discussed above, a weak point 1418 (FIG. 14) in the conveyance can be positioned between the sensor array 1104 and the larger components (e.g. acquisition electronics section 1108) such that if the larger components get stuck during retraction of the tool, the spooling mechanism can apply sufficient tension to the conveyance such that the conveyance is cut at the weak point 1418, leaving the larger component downhole to be fished later.

There has been described and illustrated herein various embodiments of methods and apparatus for downhole seismic data recording or other processes. While particular embodiments have been described, it is not intended that the invention be limited thereby. Therefore, it will be apparent to those skilled in the art that various changes and modifications may be made to the invention as described without departing from the spirit and scope of the appended claims.

The preceding description has been presented only to illustrate and describe certain embodiments. It is not intended to be exhaustive or to limit the invention to any precise form disclosed. Many modifications and variations are possible in light of the above teaching.

The embodiments and aspects were chosen and described in order to best explain the principles of the invention and its practical application. The preceding description is intended to enable others skilled in the art to best utilize the principles in various embodiments and aspects and with various modifications as are suited to the particular use contemplated. It is intended that the scope of the invention be defined by the following claims.

What is claimed is:

1. An apparatus, comprising:
a borehole conveyance system tool, the borehole conveyance system tool comprising:
a conveyance;
a sensor array disposed on the conveyance;
an acquisition electronics section disposed on the conveyance distal of the sensor array; and
a downhole tension meter capable of reporting a measured tension uphole;
wherein an outermost diameter of the sensor array is less than an outermost diameter of the acquisition electronics section.

2. An apparatus according to claim 1, wherein the acquisition electronics section comprises a logging head, telemetry electronics, and acquisition electronics.

3. An apparatus according to claim 2, wherein the logging head comprises a weak point and a tension meter, the tension meter capable of reporting a measured tension.

4. An apparatus according to claim 1, wherein the sensor array comprises a plurality of spaced acoustic receivers.

5. An apparatus according to claim 4, wherein the sensor array comprises a distal end of the conveyance.

6. An apparatus according to claim 4, wherein the conveyance is a wire line cable and wherein each acoustic receiver is packaged in a shuttle, the shuttle being approximately flush with an outer diameter of the wire line cable.

7. An apparatus according to claim 4, wherein the conveyance is a wire line cable and wherein each acoustic receiver is embedded in the wire line cable.

8. An apparatus according to claim 1, wherein the downhole tension meter is disposed between the sensor array and the acquisition electronics section.

9. An apparatus according to claim 8, further comprising a weak point disposed between the sensor array and the acquisition electronics section.

10. An apparatus according to claim 1, wherein the sensor array comprises a plurality of acoustic receivers, and further comprising a tension meter, capable of reporting a measured tension, disposed between at least one adjacent pair of acoustic receivers.

11. An apparatus according to claim 1, wherein the sensor array comprises a plurality of acoustic receivers, and further comprising a tension meter, the tension meter capable of reporting a measured tension, disposed between each adjacent pair of acoustic receivers.

12. An apparatus according to claim 11, further comprising a weak point disposed between each adjacent pair of acoustic receivers.

13. An apparatus according to claim 1, wherein the sensor array comprises a plurality of acoustic receivers, each acoustic receiver attached to another adjacent acoustic receiver by an interconnect cable, the interconnect cable comprising a weak point and a tension meter.

14. An apparatus according to claim 1, wherein the conveyance comprises a wireline logging cable.

15. An apparatus according to claim 1, further comprising a hollow fishing tool, the hollow fishing tool comprising an internal passage capable of sliding over the conveyance and over the sensor array, the hollow fishing tool comprising a grabbing mechanism for grabbing the acquisition electronics section.

16. An apparatus according to claim 15, wherein the hollow fishing tool is attached to a distal end of a drillpipe.

17. An apparatus according to claim 15, wherein the grabbing mechanism comprises barbed teeth configured to grab a logging head of the acquisition electronics section.

18. A method, comprising:
conveying a seismic sensing tool into a borehole, the seismic sensing tool comprising a sensor array and an acquisition electronics section disposed distal of the of sensor array;
weighing down the sensor array with the acquisition electronics section; and
sensing tension between the sensor array and the acquisition electronics section with a downhole tension meter located local to the sensor array and acquisition electronics section wherein an outermost diameter of the sensor array is less than an outermost diameter of the acquisition electronics section.

19. A method according to claim 18, further comprising:
reporting a tension measurement value uphole from the tension meter.

20. A method according to claim 18, further comprising:
sensing tension between sensors of the sensor array with one or more downhole tension meters located between adjacent sensors;
reporting a tension measurement value uphole from the one or more tension meters.

21. A method according to claim 18, further comprising:
feeding a fishing tool over a conveyance of the seismic sensing tool;
sliding the fishing tool over the sensor array;
grabbing a head of the acquisition electronics section with the fishing tool;
retrieving the acquisition electronics section.

22. A method according to claim 18, further comprising:
breaking a weak point between the sensor array section and the distal acquisition electronics section;
conveying a fishing tool to the acquisition electronics section;
grabbing a head of the acquisition electronics section with the fishing tool;
retrieving the acquisition electronics section.

23. An apparatus, comprising:
an acoustic logging tool, the acoustic logging tool comprising:
a conveyance;
an acquisition electronics section disposed on the conveyance;
a sensor array disposed on the conveyance;
at least one tension meter capable of measuring and reporting a tension value local to the acquisition electronics section and the sensor array wherein an outermost diameter of the sensor array is less than an outermost diameter of the acquisition electronics section.

24. An apparatus according to claim 23, wherein the at least one tension meter comprises a tension meter between the acquisition electronics section and the sensor array.

25. An apparatus according to claim 23, wherein the at least one tension meter comprises a tension meter between one or more sensors of the sensor array.

26. An apparatus according to claim 23, wherein the at least one tension meter comprises a tension meter at a logging head of the acquisition electronics section.

27. An apparatus according to claim 23, wherein the acquisition electronics section is arranged distal to the sensor array.

* * * * *